(12) United States Patent
Klein et al.

(10) Patent No.: US 11,914,759 B2
(45) Date of Patent: Feb. 27, 2024

(54) MULTI-FACTOR INTENTION DETERMINATION FOR AUGMENTED REALITY (AR) ENVIRONMENT CONTROL

(71) Applicant: Microsoft Technology Licensing, LLC, Redmond, WA (US)

(72) Inventors: Andrew Jackson Klein, Vancouver (CA); Cory Ryan Bramall, Delta (CA); Kyle Mouritsen, Vancouver (CA); Ethan Harris Arnowitz, Vancouver (CA); Jeremy Bruce Kersey, Vancouver (CA); Victor Jia, Richmond (CA); Justin Thomas Savino, Seattle, WA (US); Stephen Michael Lucas, Vancouver (CA); Darren A. Bennett, Vancouver (CA)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/579,300

(22) Filed: Jan. 19, 2022

(65) Prior Publication Data
US 2023/0137920 A1 May 4, 2023

Related U.S. Application Data

(60) Provisional application No. 63/275,864, filed on Nov. 4, 2021.

(51) Int. Cl.
*G06F 3/0481* (2022.01)
*G02B 27/01* (2006.01)
(Continued)

(52) U.S. Cl.
CPC ............ *G06F 3/011* (2013.01); *G02B 27/017* (2013.01); *G02B 27/0179* (2013.01);
(Continued)

(58) Field of Classification Search
None
See application file for complete search history.

(56) References Cited

U.S. PATENT DOCUMENTS 6,771,294 B1 * 8/2004 Pulli ................. G06F 3/011
715/764
8,884,988 B1 * 11/2014 Cho ................. G06F 3/011
345/9

(Continued)

FOREIGN PATENT DOCUMENTS

WO 2020146126 A1 7/2020

OTHER PUBLICATIONS

"HoloLens Start Menu UI", Retrieved from: https://www.youtube.com/watch?v=ES_ntyV7ITI, May 1, 2016, 4 Pages.
(Continued)

*Primary Examiner* — Jordany Nunez
(74) *Attorney, Agent, or Firm* — Foley IP Law, PLLC

(57) ABSTRACT

Examples of augmented reality (AR) environment control advantageously employ multi-factor intention determination and include: performing a multi-factor intention determination for summoning a control object (e.g., a menu, a keyboard, or an input panel) using a set of indications in an AR environment, the set of indications comprising a plurality of indications (e.g., two or more of a palm-facing gesture, an eye gaze, a head gaze, and a finger position simultaneously); and based on at least the set of indications indicating a summoning request by a user, displaying the control object in a position proximate to the user in the AR environment (e.g., docked to a hand of the user). Some examples continue displaying the control object while at least one indication remains, and continue displaying the control object during a timer period if one of the indications is lost.

20 Claims, 25 Drawing Sheets

(51) Int. Cl.
  *G06F 3/01* (2006.01)
  *G06F 3/0482* (2013.01)
  *G06F 3/0484* (2022.01)
  *G06F 3/04847* (2022.01)
  *G06F 3/16* (2006.01)

(52) U.S. Cl.
  CPC .............. *G06F 3/012* (2013.01); *G06F 3/013* (2013.01); *G06F 3/017* (2013.01); *G06F 3/0482* (2013.01); *G06F 3/04847* (2013.01); *G02B 2027/0185* (2013.01); *G02B 2027/0187* (2013.01)

(56) References Cited

U.S. PATENT DOCUMENTS

| | | | |
|---|---|---|---|
| 10,375,009 B1* | 8/2019 | Fishman | H04L 67/131 |
| 10,606,364 B2 | 3/2020 | Smith et al. | |
| 10,740,974 B1* | 8/2020 | Cowburn | H04L 67/52 |
| 10,741,026 B2* | 8/2020 | Unnerstall | G07F 17/326 |
| 10,775,998 B2* | 9/2020 | Morita | G06F 3/017 |
| 10,890,983 B2* | 1/2021 | Ravasz | G06F 3/017 |
| 10,901,502 B2* | 1/2021 | Terrano | G06F 3/04812 |
| 10,908,769 B2* | 2/2021 | Agarawala | H04L 67/142 |
| 10,955,929 B2* | 3/2021 | Ravasz | G06F 3/04845 |
| 10,969,937 B2* | 4/2021 | Schwarz | G06F 3/011 |
| 11,086,474 B2* | 8/2021 | Lee | H04N 7/157 |
| 11,093,103 B2* | 8/2021 | Agarawala | G06T 19/20 |
| 11,100,715 B2* | 8/2021 | de Jong | G06F 3/011 |
| 11,126,319 B2* | 9/2021 | Klein | G06T 19/20 |
| 11,145,135 B1* | 10/2021 | Ng | G06F 3/017 |
| 11,194,400 B2* | 12/2021 | Shen | A63F 13/212 |
| 2012/0113223 A1* | 5/2012 | Hilliges | G06F 3/011 348/46 |
| 2014/0078176 A1 | 3/2014 | Kim et al. | |
| 2014/0184919 A1* | 7/2014 | Yoshida | H04N 21/43615 348/725 |
| 2014/0333666 A1 | 11/2014 | Kroymann | |
| 2015/0185971 A1 | 7/2015 | Gomez et al. | |
| 2016/0004306 A1 | 1/2016 | Maltz | |
| 2016/0026253 A1 | 1/2016 | Bradski | |
| 2016/0162020 A1 | 6/2016 | Lehman et al. | |
| 2016/0371886 A1 | 12/2016 | Thompson | |
| 2017/0038830 A1* | 2/2017 | Clement | G06F 3/04847 |
| 2017/0083759 A1* | 3/2017 | Kowcz | G06V 20/64 |
| 2017/0287218 A1 | 10/2017 | Nuernberger et al. | |
| 2018/0045963 A1 | 2/2018 | Hoover et al. | |
| 2018/0188943 A1* | 7/2018 | Morita | G06F 3/042 |
| 2018/0286126 A1 | 10/2018 | Schwarz et al. | |
| 2019/0212828 A1* | 7/2019 | Kin | G06F 3/04815 |
| 2019/0244416 A1* | 8/2019 | Tamaoki | G09G 5/38 |
| 2019/0310758 A1* | 10/2019 | Agarawala | G06T 19/006 |
| 2019/0313059 A1 | 10/2019 | Agarawala et al. | |
| 2020/0005026 A1* | 1/2020 | Andersen | A63F 13/428 |
| 2020/0097156 A1* | 3/2020 | Yin | G06F 3/012 |
| 2020/0202634 A1 | 6/2020 | Faulkner et al. | |
| 2020/0225758 A1 | 7/2020 | Tang et al. | |
| 2020/0225813 A1* | 7/2020 | Schwarz | G06F 3/017 |
| 2020/0272231 A1* | 8/2020 | Klein | G06F 3/04845 |
| 2020/0279104 A1* | 9/2020 | Andersen | A63F 13/25 |
| 2020/0371673 A1 | 11/2020 | Faulkner | |
| 2020/0387214 A1* | 12/2020 | Ravasz | G06F 3/0233 |
| 2020/0387228 A1* | 12/2020 | Ravasz | G06F 3/04842 |
| 2020/0387229 A1* | 12/2020 | Ravasz | G06T 19/006 |
| 2020/0409457 A1* | 12/2020 | Terrano | G06F 3/012 |
| 2020/0410760 A1* | 12/2020 | de Jong | G06F 3/011 |
| 2021/0064218 A1* | 3/2021 | Agarawala | H04N 7/157 |
| 2021/0096726 A1* | 4/2021 | Faulkner | G06F 3/04815 |
| 2021/0097776 A1* | 4/2021 | Faulkner | G06V 40/113 |
| 2021/0165557 A1* | 6/2021 | Agarawala | G06F 3/04817 |
| 2021/0191600 A1* | 6/2021 | Lemay | G06F 3/0304 |
| 2021/0266663 A1* | 8/2021 | Chen | G06F 3/0304 |
| 2021/0294423 A1* | 9/2021 | Zhou | G06F 3/0304 |
| 2021/0294427 A1* | 9/2021 | Zhou | G06F 3/017 |
| 2021/0333884 A1* | 10/2021 | Li | G06V 10/25 |
| 2021/0335044 A1* | 10/2021 | Lee | G06F 3/04817 |
| 2022/0179552 A1* | 6/2022 | Burckel | G06F 3/0482 |
| 2022/0300732 A1* | 9/2022 | Eirinberg | G02B 27/0172 |
| 2023/0135974 A1* | 5/2023 | Klein | G02B 27/017 345/156 |

OTHER PUBLICATIONS

Azai, et al., "Open Palm Menu: A Virtual Menu Placed in Front of the Palm", In Proceedings of the 9th Augmented Human International Conference, Feb. 7, 2018, 5 Pages.

Nopanen, Vesa, "Microsoft Hololens 2—Experiencing the Future Today", Retrieved from: https://myteamsday.com/2021/06/18/hololens2/amp/, Jun. 18, 2021, 22 Pages.

Pfeuffer, et al., "Gaze + Pinch Interaction in Virtual Reality", In Proceedings of the 5th Symposium on Spatial User Interaction, Oct. 16, 2017, pp. 99-108.

"International Search Report and Written Opinion Issued in PCT Application No. PCT/US22/043399", dated Jan. 2, 2023, 14 Pages.

"International Search Report and Written Opinion Issued in PCT Application No. PCT/US22/040683", dated Nov. 25, 2022, 13 Pages.

White, et al., "Interaction and Presentation Techniques for Shake Menus in Tangible Augmented Reality", In Proceedings of 8th IEEE International Symposium on Mixed and Augmented Reality, Oct. 19, 2009, pp. 39-48.

"Non Final Office Action Issued in U.S. Appl. No. 17/562,569", dated Oct. 14, 2022, 13 Pages.

"Final Office Action Issued in U.S. Appl. No. 17/562,569", dated Mar. 16, 2023, 8 Pages.

"Non Final Office Action Issued in U.S. Appl. No. 17/562,569", dated Jul. 5, 2023, 14 Pages.

"Final Office Action Issued in U.S. Appl. No. 17/562,569", dated Nov. 16, 2023, 16 Pages.

* cited by examiner

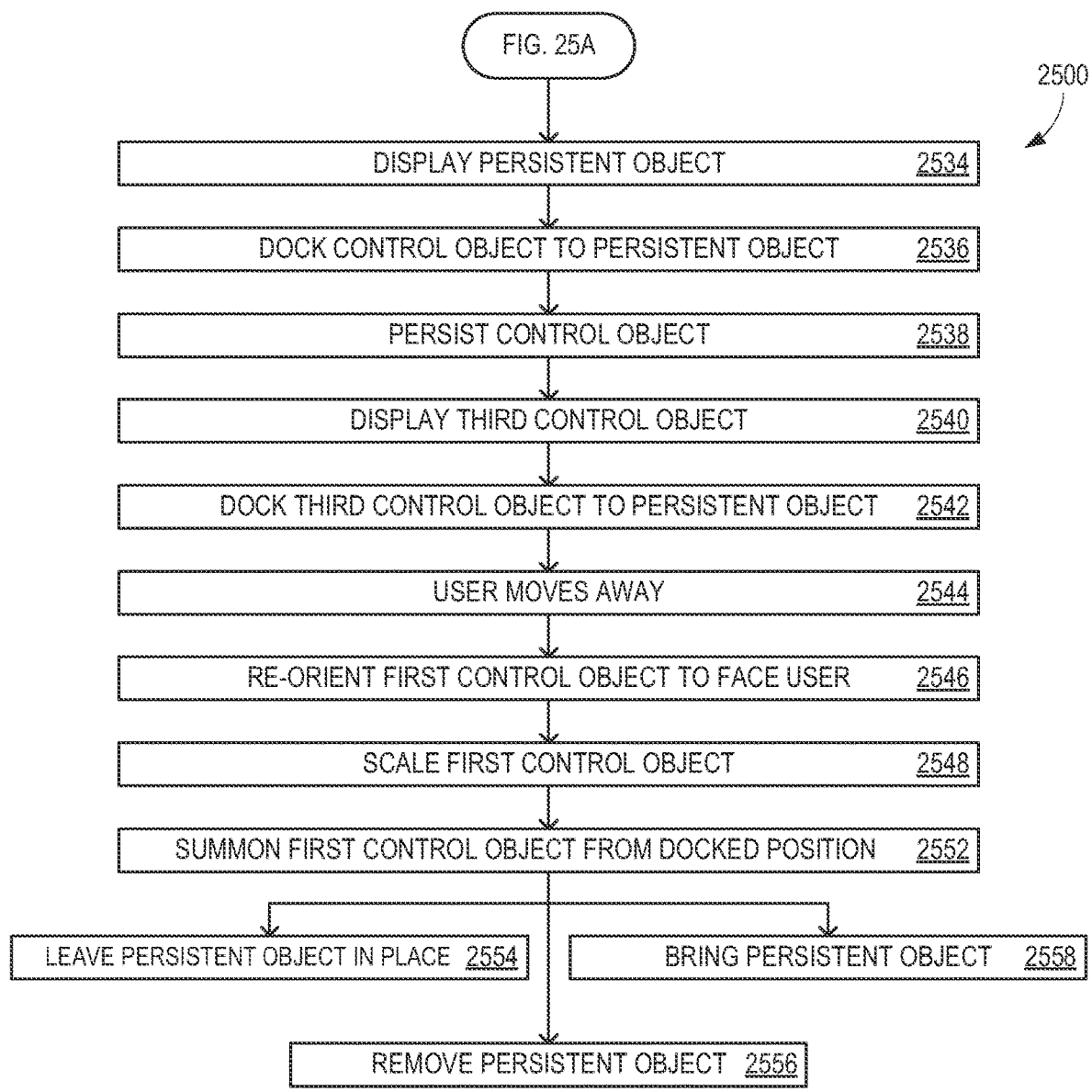

MULTI-FACTOR INTENTION DETERMINATION FOR AUGMENTED REALITY (AR) ENVIRONMENT CONTROL

CROSS-REFERENCE TO RELATED APPLICATION

This application claims priority to U.S. Provisional Patent Application No. 63/275,864, entitled "MULTI-FACTOR INTENTION DETERMINATION FOR AUGMENTED REALITY (AR) ENVIRONMENT CONTROL," filed on Nov. 4, 2021, the disclosure of which is incorporated herein by reference in its entirety.

BACKGROUND

In an augmented reality (AR) environment, digital objects, such as annotations, control objects, and virtual reality (VR) objects, are overlaid with live real-world (RW) images in a user display, such as goggles. One function of AR is to provide additional information to a user about an RW object, such as highlighting an RW object and/or providing additional information about that RW object—within the user's view. As used herein, mixed reality (MR) is an extension of AR, in which the digital objects displayed to the user (and with which the user may be able to interact) include virtual reality (VR) objects.

There is often a need for control objects, such as menus, control panels, and display screens in AR environments, so that the user is able to control the activation and placement of the digital objects. The control objects are a subset of the digital objects that are available for display to the user, and may include annotations instructing the user how to perform certain actions, such as maintenance or repair of RW objects. Unfortunately, an object placement controller, that activates and controls the virtual position of digital objects (including control objects), may not properly understand the user's intentions regarding a control object.

This may result in a control object being prematurely removed or positioned in a manner that conflicts with another digital object or is distracting to the user. Such misunderstandings may negatively impact the user's ability to control the AR environment, thereby degrading the user's experience.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples of augmented reality (AR) environment control advantageously employ multi-factor intention determination and include: performing a multi-factor intention determination for summoning a control object (e.g., a menu, a keyboard, or an input panel) using a set of indications in an AR environment, the set of indications comprising a plurality of indications (e.g., two or more of a palm-facing gesture, an eye gaze, a head gaze, and a finger position simultaneously); and based on at least the set of indications indicating a summoning request by a user, displaying the control object in a position proximate to the user in the AR environment (e.g., docked to a hand of the user). Some examples continue displaying the control object while at least one indication remains, and continue displaying the control object during a timer period if one of the indications is lost.

BRIEF DESCRIPTION OF THE DRAWINGS

The disclosed examples are described in detail below with reference to the accompanying drawing figures listed below:

FIGS. 25A and 25B show a flowchart illustrating exemplary operations associated with the arrangement of FIG. 1;

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure improve the operations of computing devices used for AR at least by improving the accuracy of user intention determination (e.g., reducing the probability of displaying, or ceasing to display, a control object when it is not the user's intention) by employing multi-factor intention determination for a control object. An intelligent user intention determination framework knows when to watch a user's hands, works with either left or right hand, and also knows when to keep the view clean (e.g., dismiss control objects, such as menus, input panels, and keyboards), improving user experience in volumetric computing. Aspects of the disclosure also improve the operations of computing devices used for AR by intelligently docking control objects and re-orienting control objects.

Figure 1:
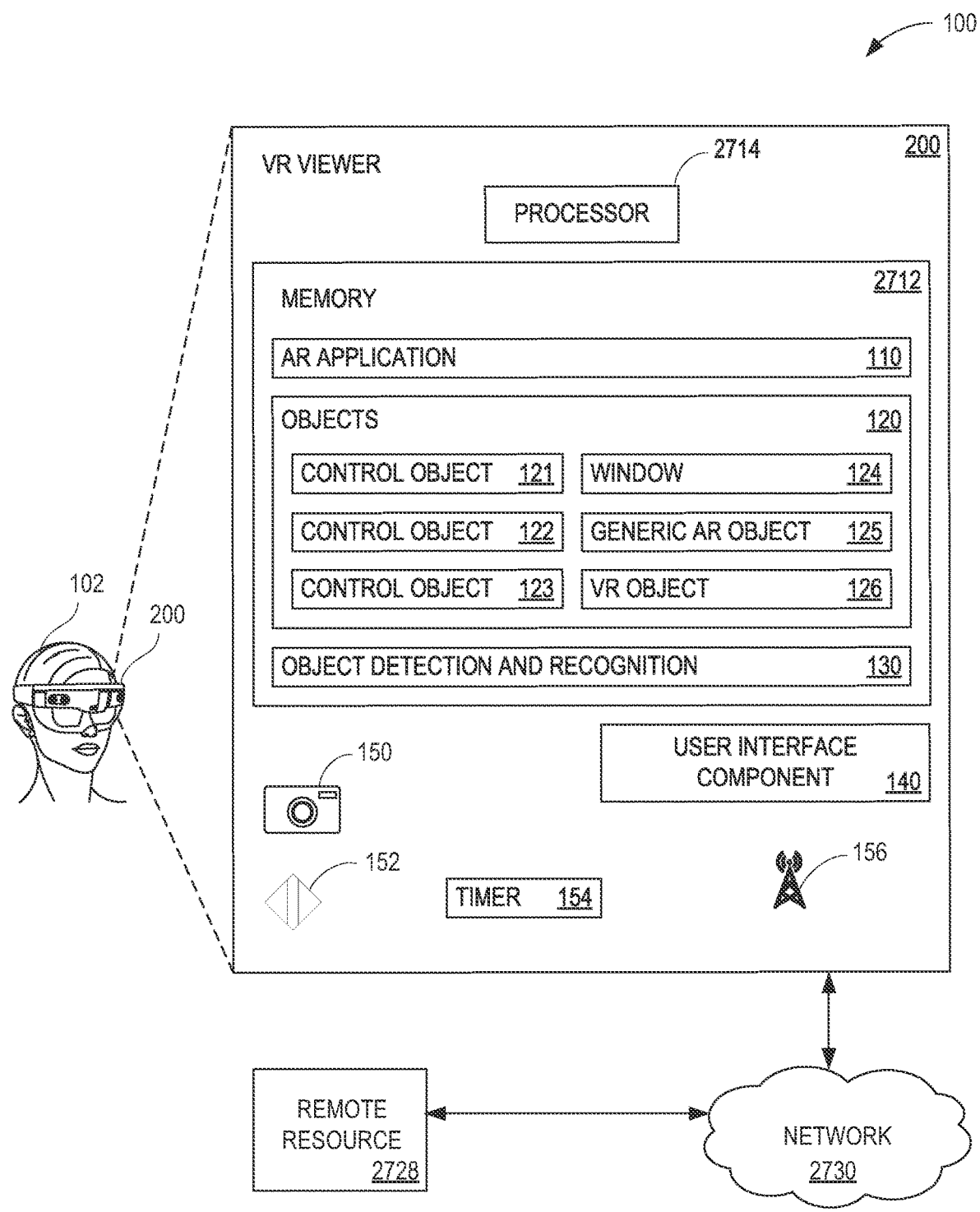
FIG. 1 illustrates an example arrangement that advantageously employs multi-factor intention determination for augmented reality (AR) environment control.

FIG. 1 illustrates an example arrangement 100 that advantageously employs multi-factor intention determination for AR environment control us in an AR viewer 200. In some examples, AR viewer 200 comprises an example of computing device 2700 of FIG. 27. In some examples, AR viewer 200 comprises three-dimensional (3D) goggles worn by a user 102. AR viewer 200 may perform the calculations, computations, and determinations described herein locally (on AR viewer 200), remotely (using a remote resource 2728 across a computer network 2730), or with a combination of local and remote computing. Further detail for computing device 2700, remote resource 2728, and computer network 2730 are provided in relation to FIG. 27.

AR viewer 200 comprises a processor 2714, and a memory 2712. AR viewer 200 has a user interface component 140, at least one or more of a video sensor 150 (e.g., a camera), using two video sensors 150 for stereoscopic (3D) imagery, a sensor suite 152 for determining a position and orientation of AR viewer 200 and eye gaze of user 102, a timer 154 (e.g., a decay timer), and a communication component 156 for communicating over computer network 2730. User interface component 140 provides a screen (or two screens for 3D or stereoscopic viewing) for displaying AR video to user 102. AR video comprises live stream video from the one or more video sensors 150 overlaid with one or more digital objects 120, under the control of an AR application 110. AR viewer 200 displays the AR video (including control objects) to user 102 with user interface component 140.

AR application 110, which may be distributed among AR viewer 200 and remote resource 2728, performs the multi-factor intention determination and controls the display and positioning of the control objects, as described herein. An object detection and recognition component 130 recognizes actions of user 102, such as hand position, motion, and gestures. Object detection and recognition component 130 also detects and recognizes RW objects to enable selection and placement of AR annotations (e.g., window 124, described below). Object detection and recognition component 130 may also be distributed among AR viewer 200 and remote resource 2728.

Objects 120 includes multiple digital objects, as shown, although it should be understood that a larger number of digital objects may be used (with some stored on remote resource 2728). As illustrated, objects 120 includes a control object 121, which may be a menu, a control object 122, which may be an input panel, and a control object 123, which may be a keyboard (a virtual keyboard). Control objects are digital objects that accept user input in order to control aspects of an AR environment, such as which other control objects and/or annotations are displayed. Objects 120 also includes an window 124, which provides information regarding an RW object (often in close proximity to that RW object), a generic AR object 125, and a VR object 126. Any of objects 120 may displayed in an AR environment 300, shown in FIG. 3.

Figure 2:
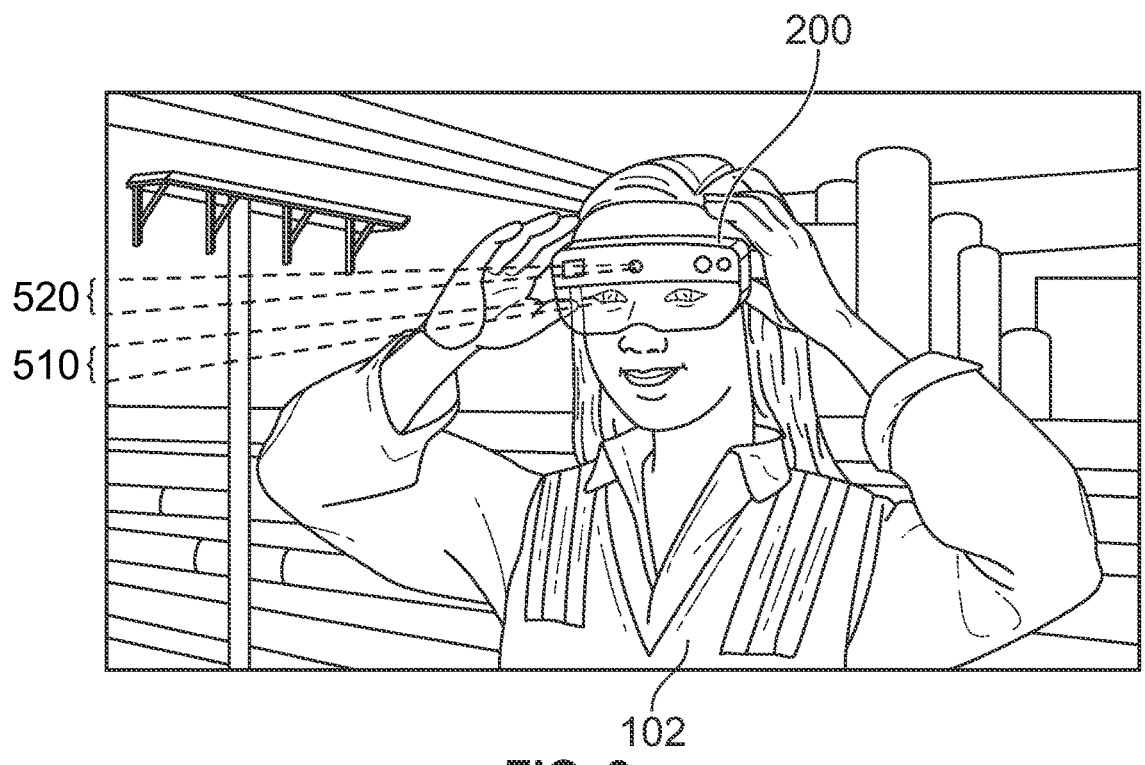
FIG. 2 illustrates a user employing an AR viewer.

FIG. 2 illustrates user 102 employing AR viewer 200. An eye gaze 510 (based on the orientation of the eyes of user 102) and a head gaze 520 (based on the pointing direction of AR viewer 200) are annotated in FIG. 2. Eye gaze 510 and head gaze 520 are sensed by sensor suite 152, and may be tracked. Eye gaze 510 and/or head gaze 520 may be used as indications of an intent by user 102.

Figure 3:
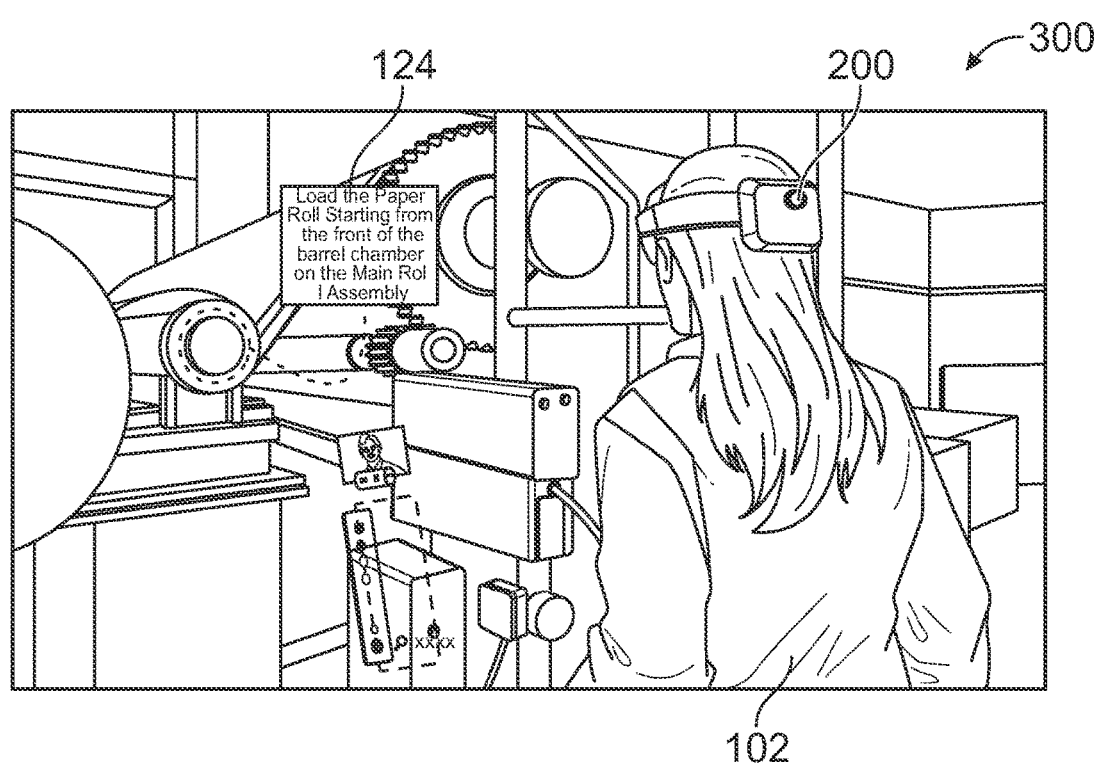
FIG. 3 illustrates the user immersed in an AR environment.

FIG. 3 illustrates user 102 immersed in AR environment 300, wearing AR viewer 200. Multiple digital objects are shown, including an information display window 124, that displays information about an RW object. In the illustrated example, user 102 is using AR viewer 200 to assist with diagnosis of a maintenance condition for machinery. In some examples, AR environment 300 comprises an MR environment. As shown in FIG. 3, there may be multiple persistent objects in AR environment 300 with which user 102 is able to interact.

Figure 4:
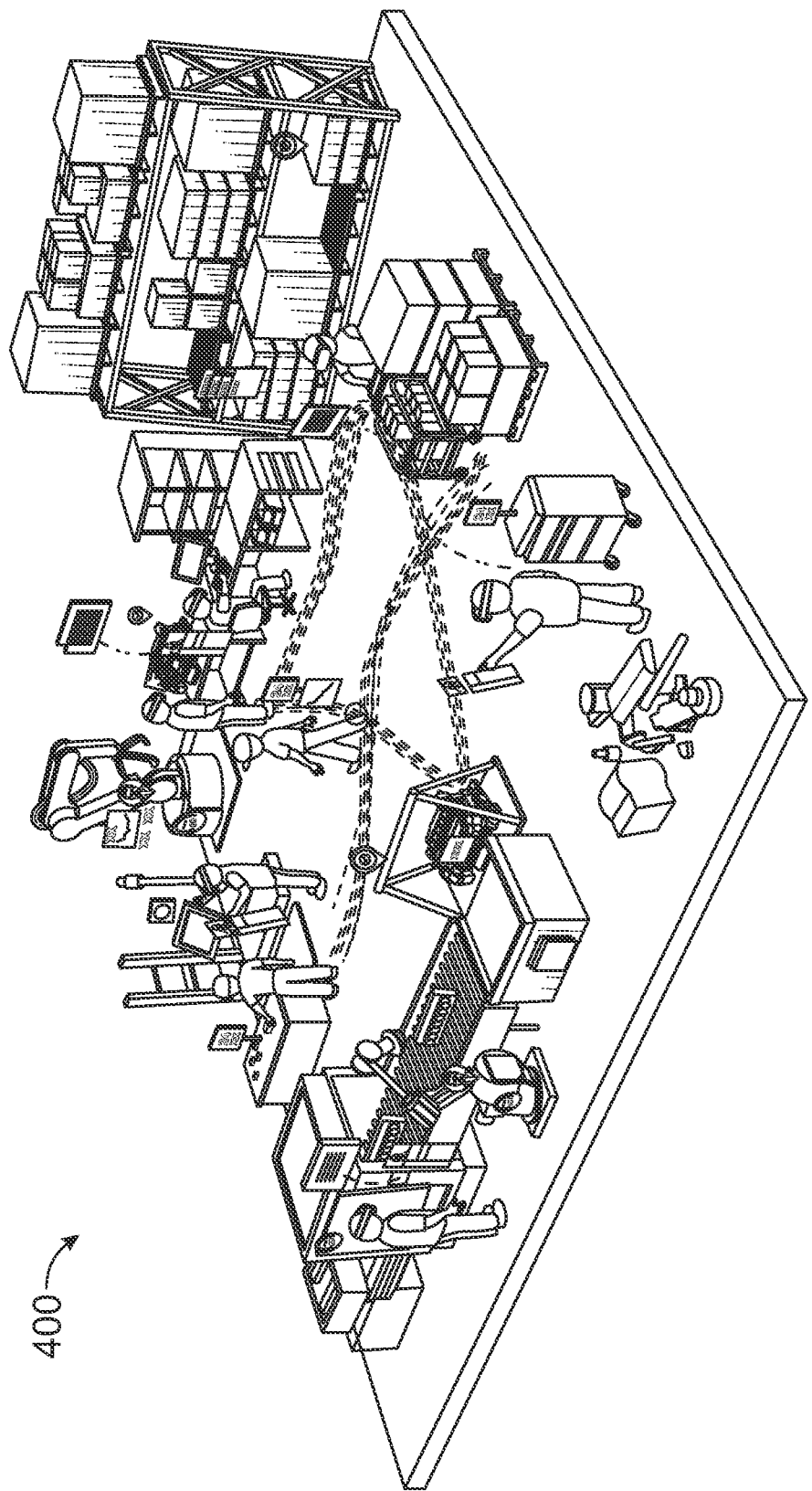
FIG. 4 illustrates multiple practical applications of the improved AR environment control provided by the arrangement of FIG. 1.

FIG. 4 illustrates multiple practical applications of the improved AR environment control provided by arrangement 100, in an industrial setting 400. AR application 110 provides a tool for workers by giving them the understanding they need to act upon reality, and is broadly applicable across multiple industry scenarios. Use cases exist in bio-pharmaceuticals, semi-conductors, health and life sciences, retail, and energy. AR augments workers' natural adaptability, delivering insights and flexible guidance to assist workers with complex tasks, for example by enabling seamless collaboration with a remote expert providing instructions. This improves work and product quality by leveraging computer vision checkpoints to catch errors as they occur.

Practical applications, shown in industrial setting 400 include inspection and asset capture, accessing service-related asset information (e.g., for display in window 124), remote assistance (e.g., maintenance, repair, and assembly annotations for RW objects), remote inspection, process optimization, asset and inventory management, and machinery operation.

Figure 5:
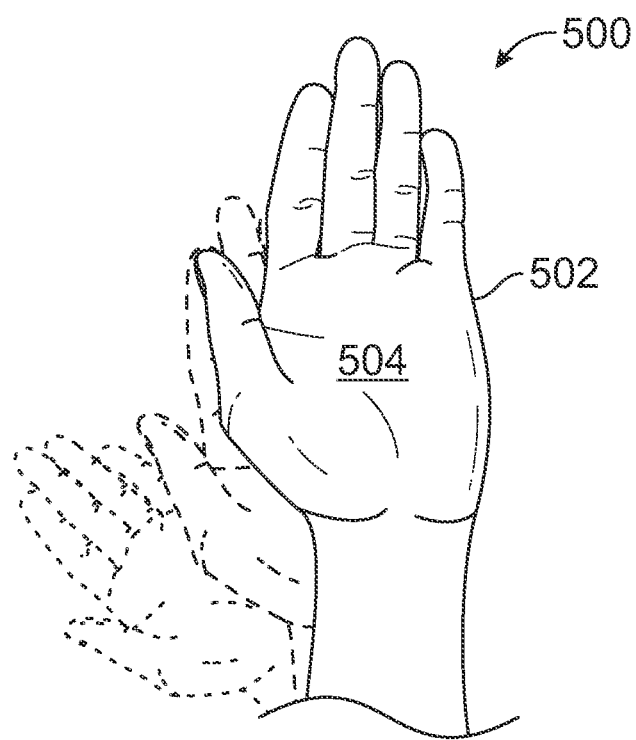
FIG. 5 illustrates a palm-facing gesture for summoning a control object.

FIG. 5 illustrates a palm-facing gesture 500 for summoning a control object, which may be a menu, a keyboard, an input panel, a virtual display, or a virtual touchscreen. In palm-facing gesture 500, a hand 502 of user 102 is visible to sensor suite 152, and oriented such that a palm 504 of hand 502 is visible. In some examples, hand 502 may be a left hand or a right hand.

Figure 6:
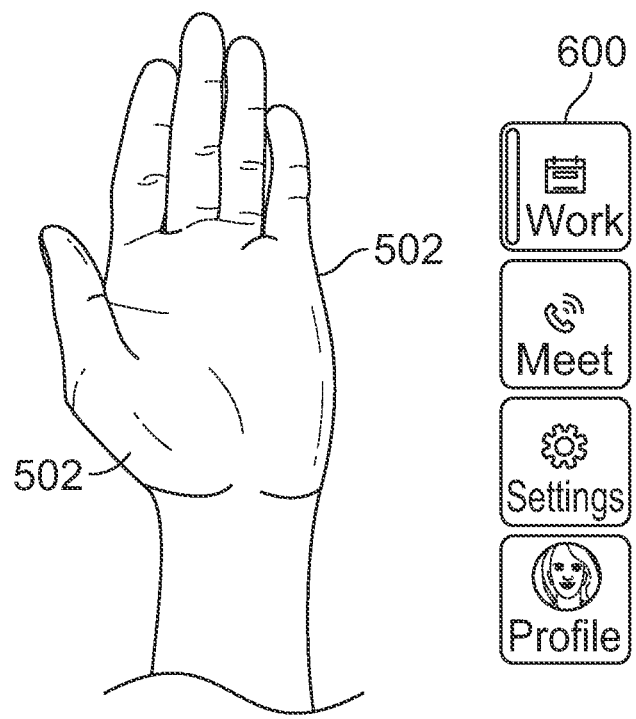
FIG. 6 illustrates a menu control object.
Figure 11:
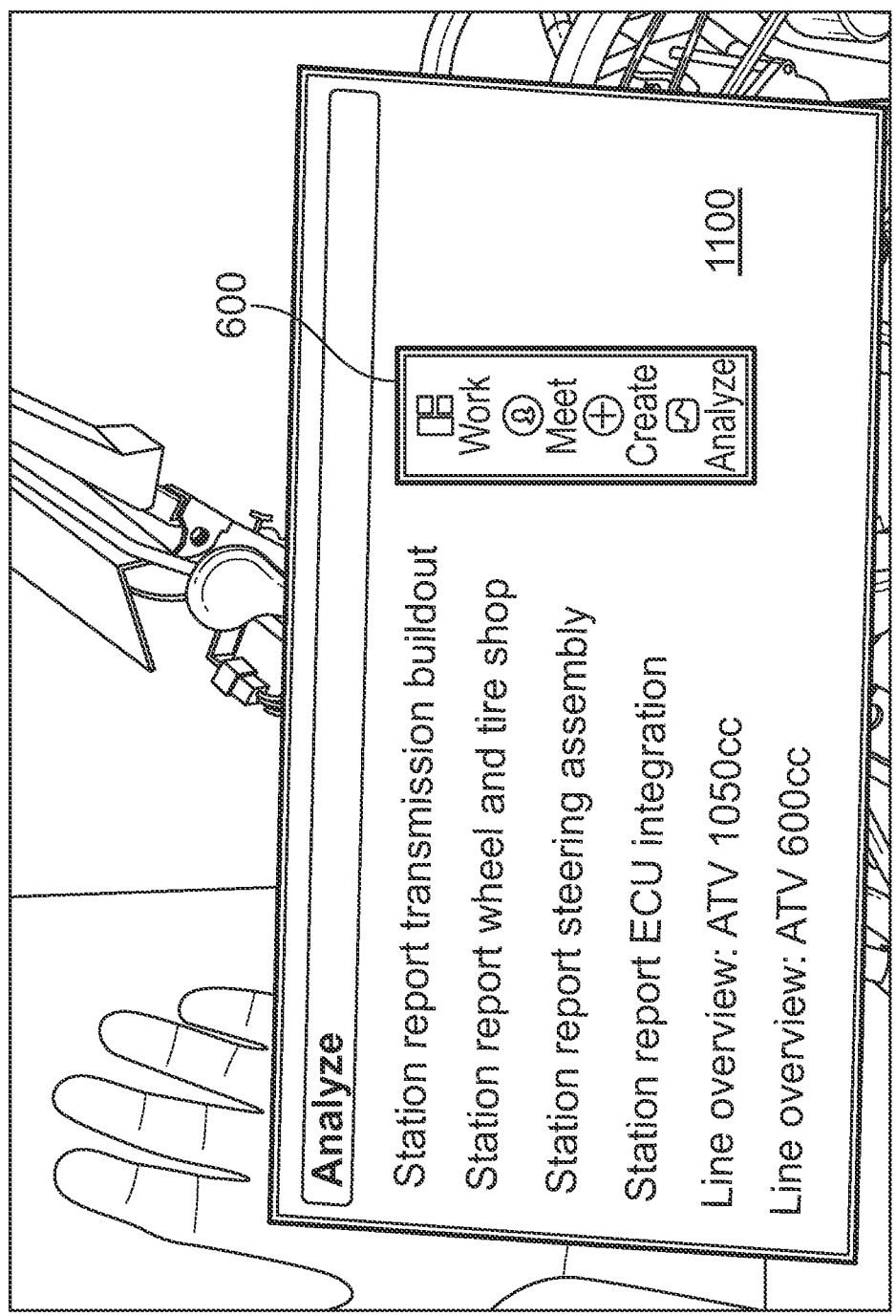
FIG. 11 illustrates the display of a persistence object (e.g., an input panel) prior to docking by the control object of FIG. 6.

FIG. 6 illustrates a control object 600 that is a menu. The illustrated menu has four buttons, one of which activates display of a second control object (as shown in FIG. 11, below). However, in some examples, control object 600 may be any of control objects 121-123 of FIG. 1, for example, an input panel or a keyboard. It should be noted that control object 600 does not merely pop up upon palm 504 of hand 502 becoming visible to sensor suite 152. Palm-facing gesture 500 is only a single indication of user 102 desiring display of control object 600, and may occur for other reasons while user 102 is using hand 502 (or other hand 802) to perform some work functions. When using only a single factor for intention determination, there may be an excessive number of false alarms. The false alarm activations of control objects may be distracting, and may be more prevalent in scenarios in which users are working with their hands (e.g., physical maintenance or repair tasks).

Thus, multi-factor intention determination is used for summoning control object 600. In some examples, the multi-factor intention determination comprises a two-factor intention determination, in which two indications are detected prior to displaying (or summoning) control object 600. Palm-facing gesture 500, using either hand (in some examples), may be one indication. The other indication may be any of eye gaze 510 toward palm 504, head gaze 520 toward palm 504, and a voice command. In some examples sensor suite 152 includes a microphone, and AR application 110 includes voice recognition capability.

Control object 600 is displayed (by AR viewer 200) in a position proximate to user 102 in AR environment 300, for example docked to the side of hand 502 (which was used for palm-facing gesture 500). This permits control object 600 to move with hand 502. In some examples, when palm-facing gesture 500 is detected, a visual indication, such as a glow or highlighting effect applied to hand 502, alerts user 102 that palm-facing gesture 500 had been detected. User 102 may summon control object 600 when control object 600 is not displayed anywhere within AR environment 300 or even when control object 600 is fixed in place, elsewhere within AR environment 300, as described below.

In some examples, once control object 600 is docked to hand 502, and hand 502 continues palm-facing gesture 500, control object 600 remains docked (and displayed), even if eye gaze 510 and head gaze 520 are directed elsewhere. However, when hand 502 is moved out of palm-facing gesture 500, timer 154 is started as a time-out for displaying control object 600. In some examples, the time-out period (expiration value) is two seconds. During this time-out period, control object 600 will remain in a fixed location. In some examples, performing palm-facing gesture 500 with other hand 802 will cause control object 600 to dock to other hand 802, and cancel timer 154.

If, upon expiration of the time-out period, user 102 had not provides an indication of an intention to continue working with control object 600, display of control object 600 ceases. Either control object 600 will be removed from AR environment 300, or control object 600 may snap back to a prior position within AR environment 300, from which it had been summoned (as described in relation to FIGS. 20 and 21).

However, if user 102 does provide an indication of an intention to work with control object 600, prior to timer 154 reaching the expiration value (e.g., the end of the time-out period), display of control object 600 continues. In some examples, an indication of an intention to use control object 600 comprises a finger pointing toward control object 600 and/or a hand within a proximity threshold 1002 (of FIG. 10) of control object 600. Either hand may be used for the indication of an intention to continue working with control object 600, hand 502 that summoned control object 600 with palm-facing gesture 500, or other hand 802.

Figure 7:
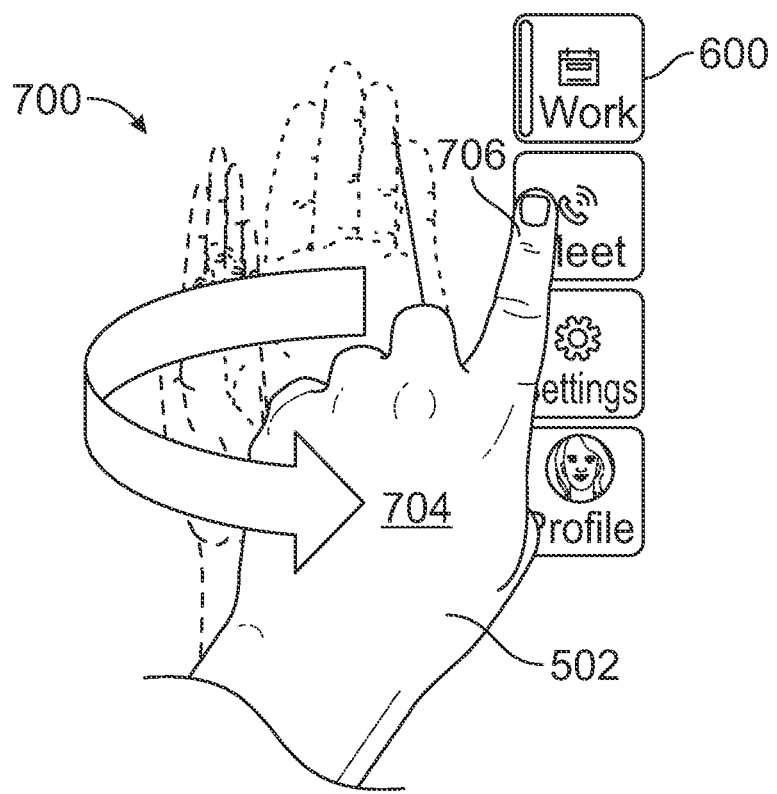
FIG. 7 illustrates the user giving an indication of an intention to use the control object of FIG. 6 with the same hand as used to summon the control object of FIG. 6.

FIG. 7 illustrates user 102 giving an indication 700 of an intention to use control object 600 with hand 502, which is the same hand as used to summon control object 600. In FIG. 7, hand 502 is turned over within the time-out period, so that back 704 of hand 502 is visible to sensor suite 152, and a finger 706 is pointing toward control object 600. Additionally, hand 502 is within close proximity of control object 600, as described in relation to FIG. 10. Subject to accessibility considerations, control object 600 remains fixed in place within AR environment 300 (world locked) during the time-out period, and after indication 700 is detected. Accessibility considerations may drive alternative behaviors, in some examples.

Figure 8:
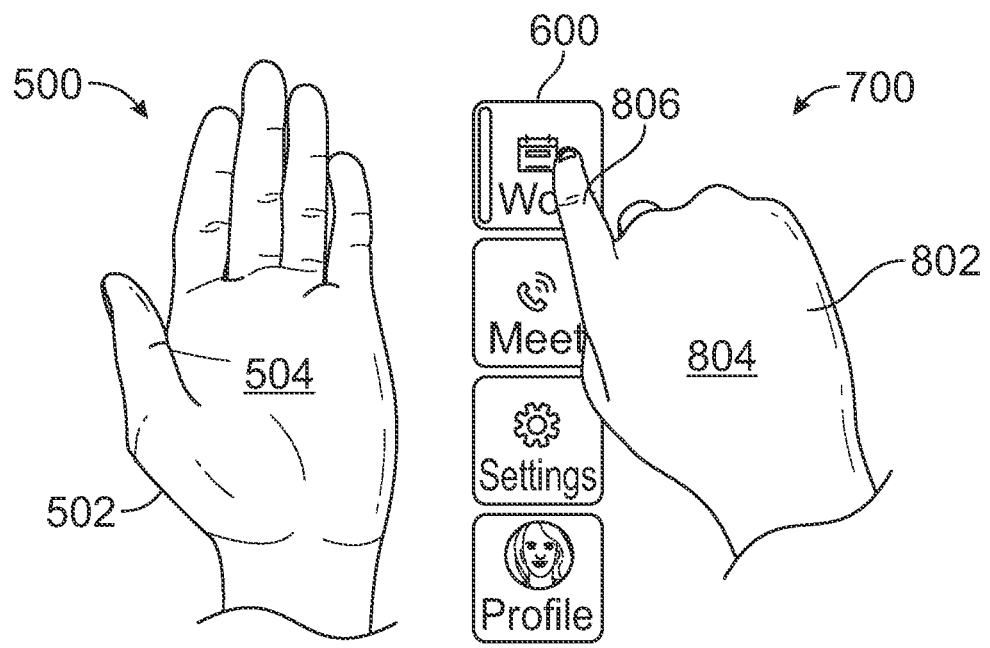
FIG. 8 illustrates the user employing both hands, one to summon the control object of FIG. 6, and the other to give the indication of the intention to use the control object of FIG. 6.

FIG. 8 illustrates user 102 employing both hands, hand 502 to summon control object 600, and other hand 802 (a different hand) to give indication 700 of the intention to use control object 600. In FIG. 8, finger 806 is pointing toward control object 600, back 804 of other hand 802 is visible to sensor suite 152, and other hand 802 is within close proximity of control object 600. In FIG. 8, both palm-facing gesture 500 and indication 700 are present. In some examples, when both hands are used, either palm-facing gesture 500 or indication 700 may retain display of control object 600. However, when both palm-facing gesture 500 and indication 700 disappear, timer 154 starts for the countdown to clean up display of control object 600.

Figure 9:
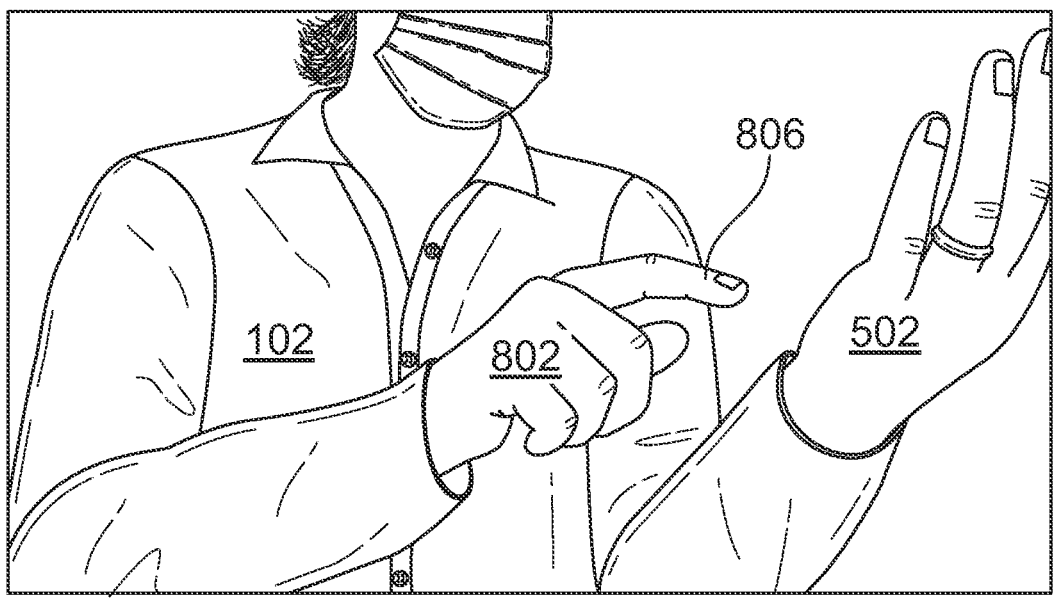
FIG. 9 illustrates a real world (RW) pose of the user as may occur during the scenario depicted in FIG. 8.

FIG. 9 illustrates a real world (RW) pose of user 102 as may occur during the scenario depicted in FIG. 8. User 102, hand 502, other hand 802, and finger 806 are marked.

Figure 10:
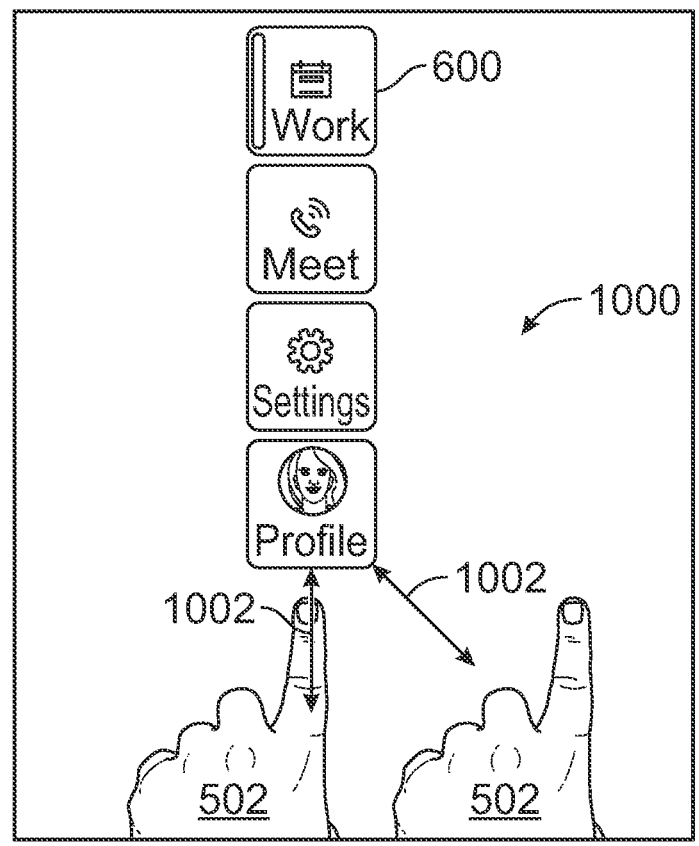
FIG. 10 illustrates a proximity threshold for the control object of FIG. 6.

FIG. 10 illustrates a proximity threshold 1002 for control object 600. In some examples, a proximity condition may acts as an indication 1000 of user 102 intending to use control object 600. When hand 502, or other hand 802, is within proximity threshold 1002 of control object 600, indication 1000 may be used as a basis for continuing to display control object 600. In some examples, eye gaze 510 also continues display of control object 600. However, when no hand is within proximity threshold 1002 of control object 600, indication 1000 is not true (and eye gaze 510 is elsewhere), timer 154 is started for cleaning up display of control object 600. In some examples, proximity threshold 1002 is 10 centimeters (cm).

FIG. 11 illustrates the display of a persistence object 1100 prior to docking by control object 600. In the illustrated example, persistence object 1100 is an input panel, which is also a control object. In some examples, persistence object 1100 may be any of control objects 121-123, for example another menu, a keyboard, a virtual display, or a virtual touchscreen. In some examples, persistence object 1100 is initially displayed in the center of eye gaze 510 or head gaze 520. In some examples, persistence object 1100 is initially displayed at a predetermined height within AR environment 300 that had been determined to be ergonomic. In some examples, a menu button on control object 600 is used to activate (initiate display of) persistence object 1100.

Figure 12:
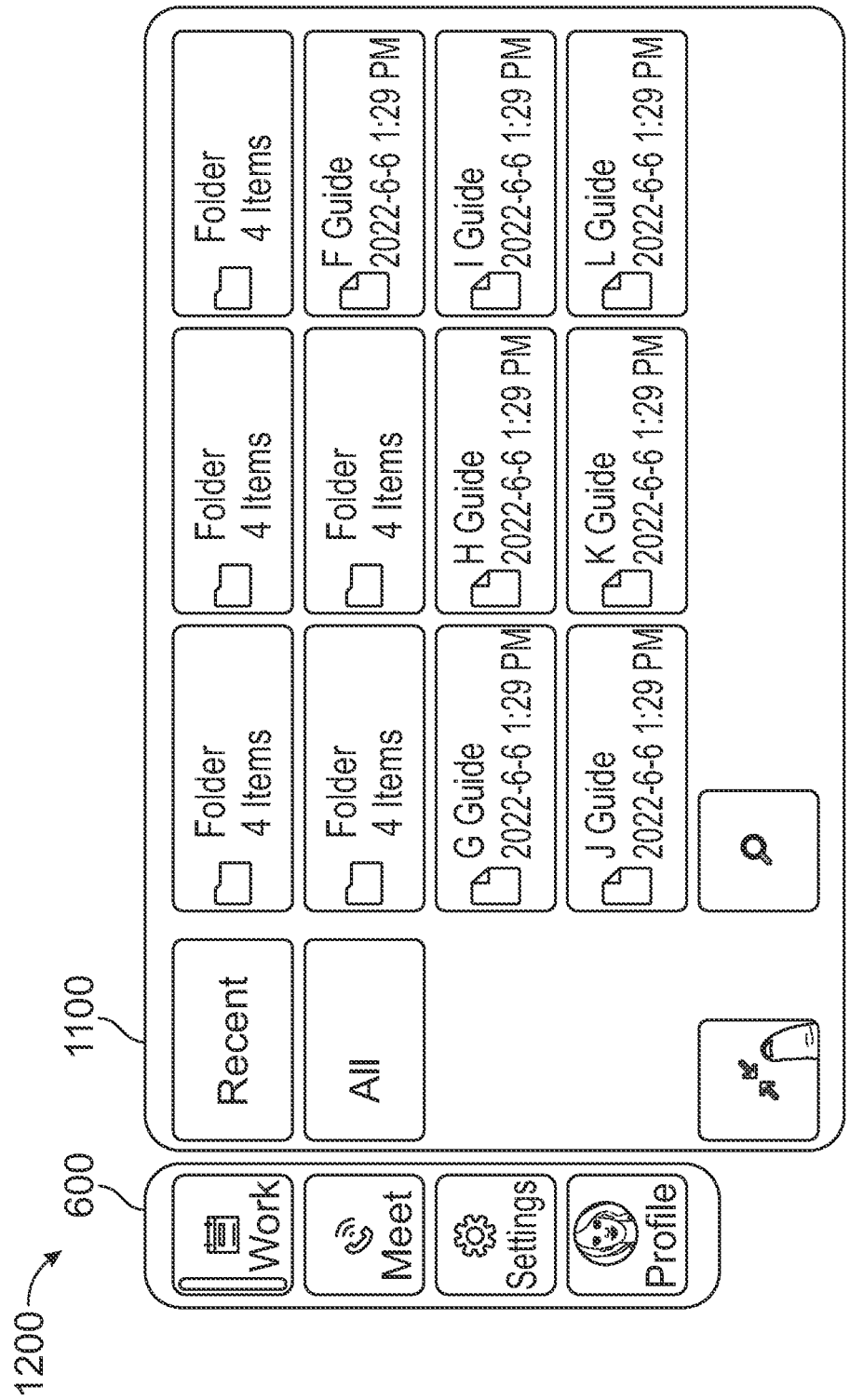
FIG. 12 illustrates the control object of FIG. 6 docked to the persistence object of FIG. 11.

FIG. 12 illustrates control object 600 docked to persistence object 1100. Shortly after display of persistence object 1100 begins, control object 600 docks to persistence object 1100. In FIG. 12, the menu docking position is the left side of persistence object 1100, but some examples may use other positions (e.g., top, right side, or bottom). The combination is indicated as a docked arrangement 1200. In some examples, control object 600 docks only to a hand or persistence object 1100 (which was activated by control object 600), or remains fixed in place while timer 154 is a counting down the time-out period.

Figure 13:
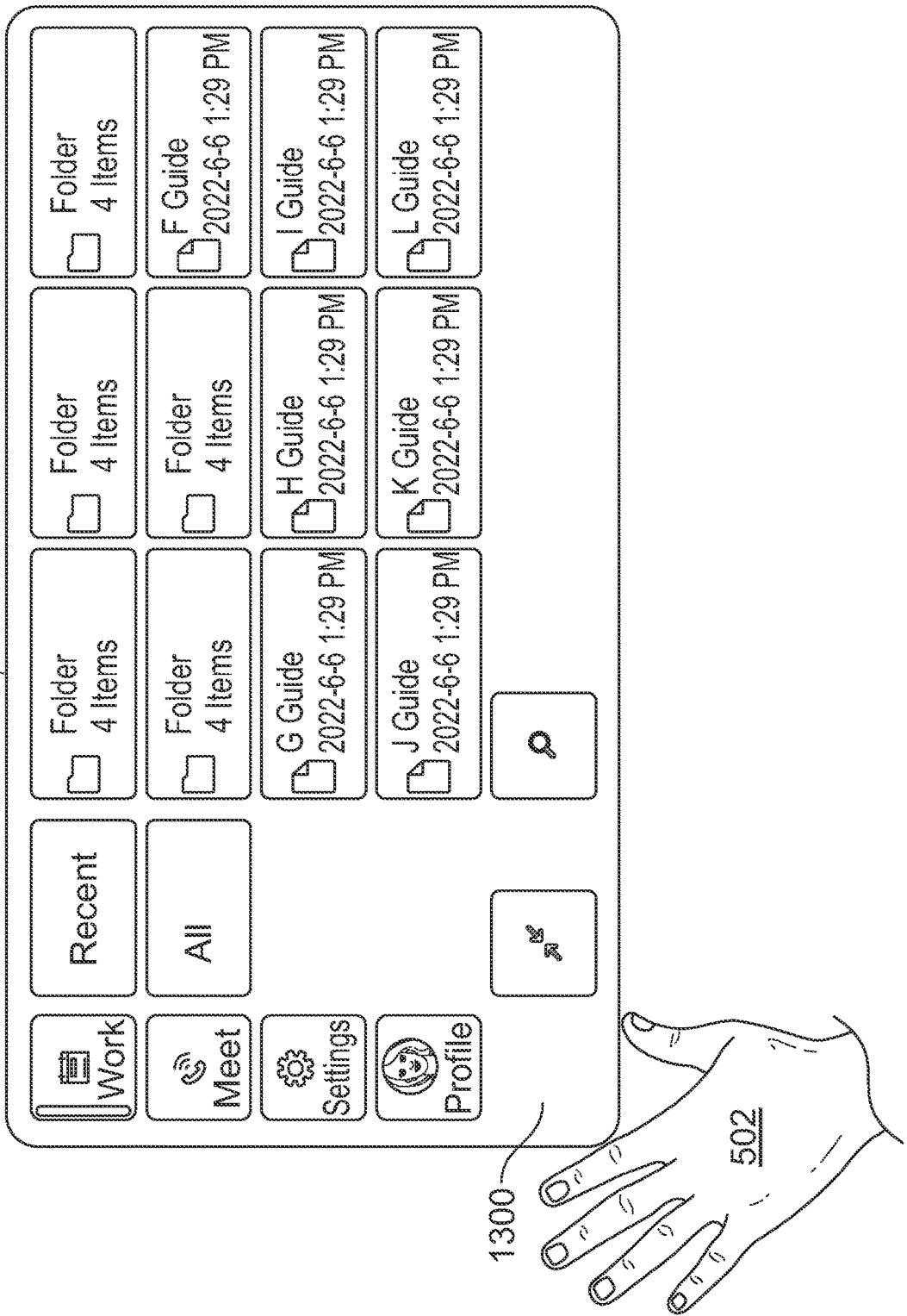
FIG. 13 illustrates a manipulation point for the user to use when adjusting the position of the docked arrangement of FIG. 12.

Once control object 600 docked to persistence object 1100, it remains available (displayed, without the time-out period tracked by timer 154) and fixed in position within AR environment 300. That is, display of control object 600 continues while persistence object 1100 remains within AR environment 300, even if user 102 moves away and looks away (e.g., both eye gaze 510 and head gaze 520 move away from docked arrangement 1200). In some examples, when persistence object 1100 is dismissed by user 102, control object 600 is also dismissed, whereas, in some examples, when persistence object 1100 is dismissed by user 102, control object 600 remains for the time-out period to permit user 102 to provide indication 700 or indication 1000 to retain display of control object 600. is also dismissed FIG. 13 illustrates a manipulation point 1300 for user 102 to grab when adjusting the position of docked arrangement 1200. In some examples, when hand 502 approaches docked arrangement 1200, manipulation point 1300 is highlighted to illustrate its edges to user 102. In some examples, alternative interaction techniques are employed. Example alternatives include pressing a (virtual) button versus grabbing and moving a control object.

Figure 14:
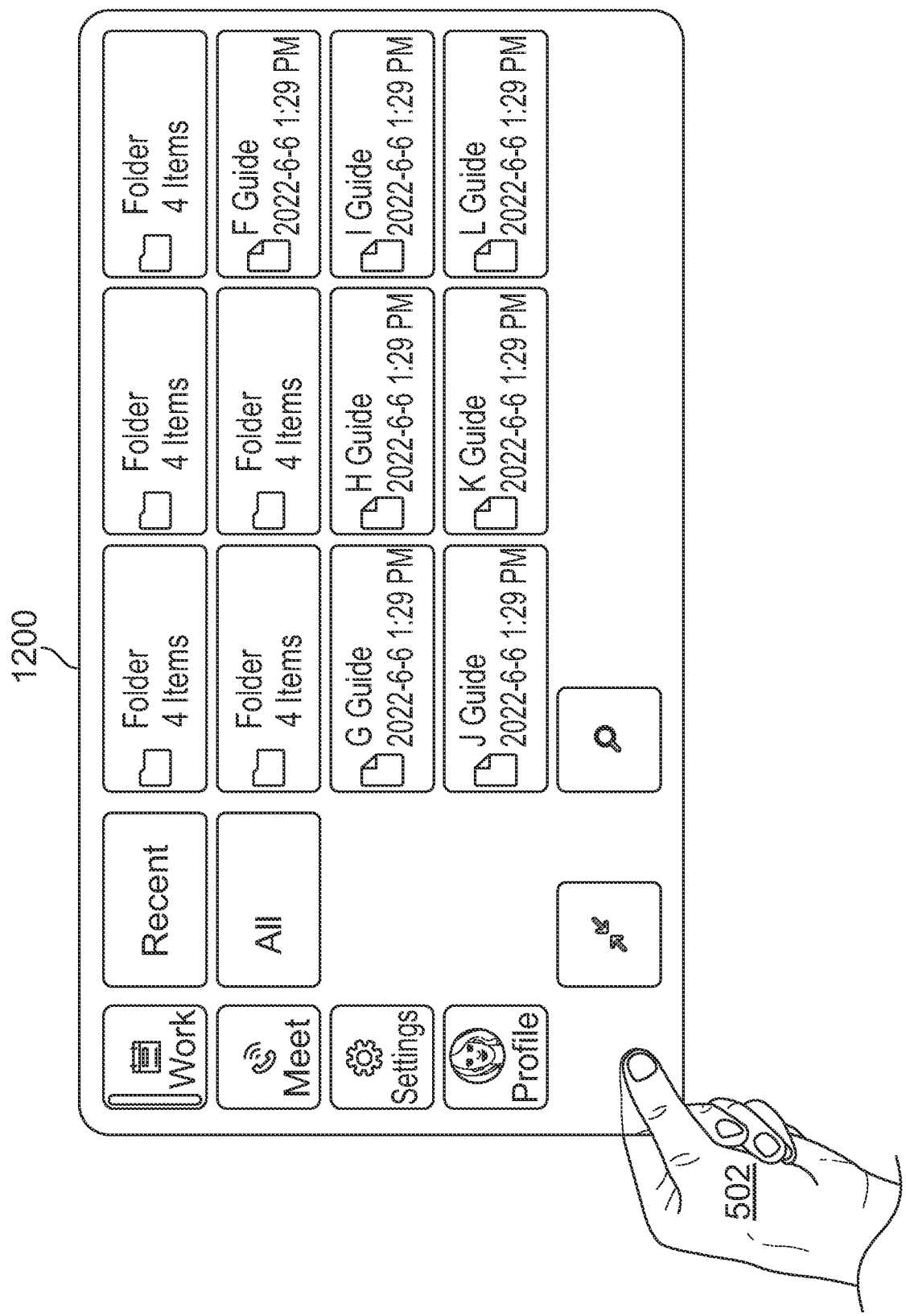
FIG. 14 illustrates the user re-positioning the docked arrangement of FIG. 12.

FIG. 14 illustrates user 102 re-positioning docked arrangement 1200 by grabbing manipulation point 1300 with hand 502 and moving hand 502. Once re-positioned, docked arrangement 1200 will remain in that new position until user 102 either re-positions docked arrangement 1200 again or dismisses docked arrangement 1200.

Figure 15:
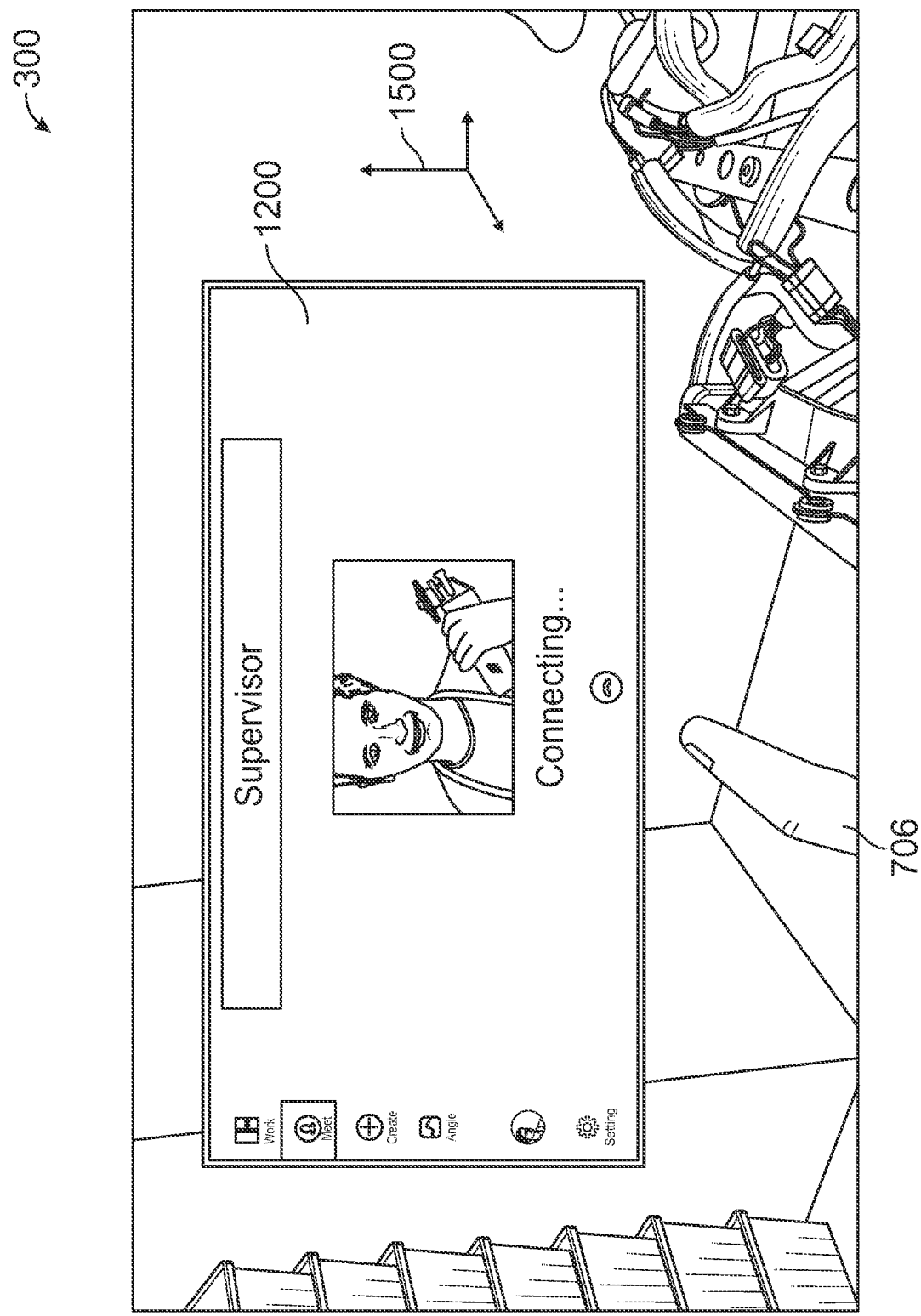
FIG. 15 illustrates the docked arrangement of FIG. 12 in a fixed position within the AR environment of FIG. 3.
Figure 16:
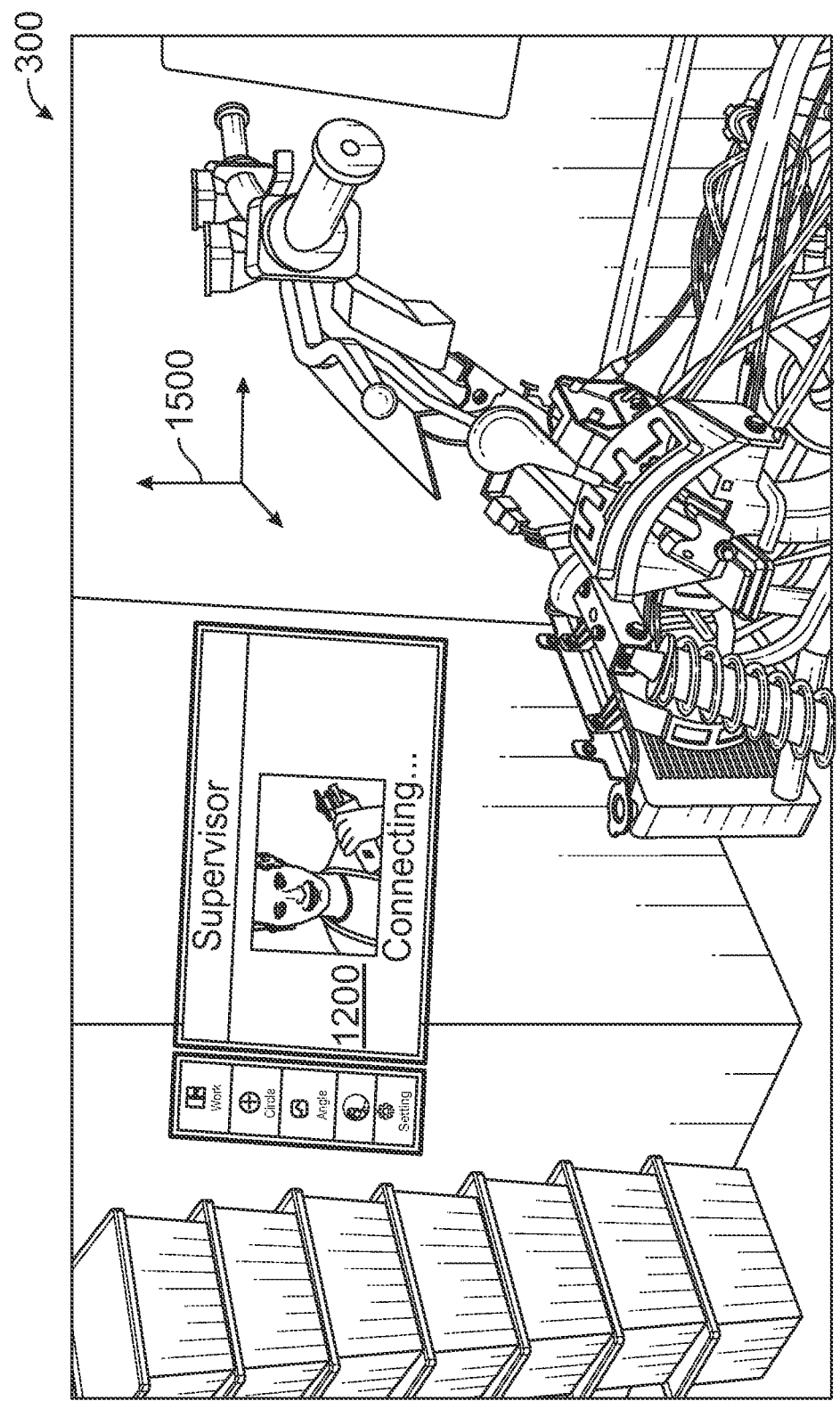
FIG. 16 illustrates the docked arrangement of FIG. 12 remaining in its fixed position within the AR environment of FIG. 3, even as the user's position changes.
Figure 17:
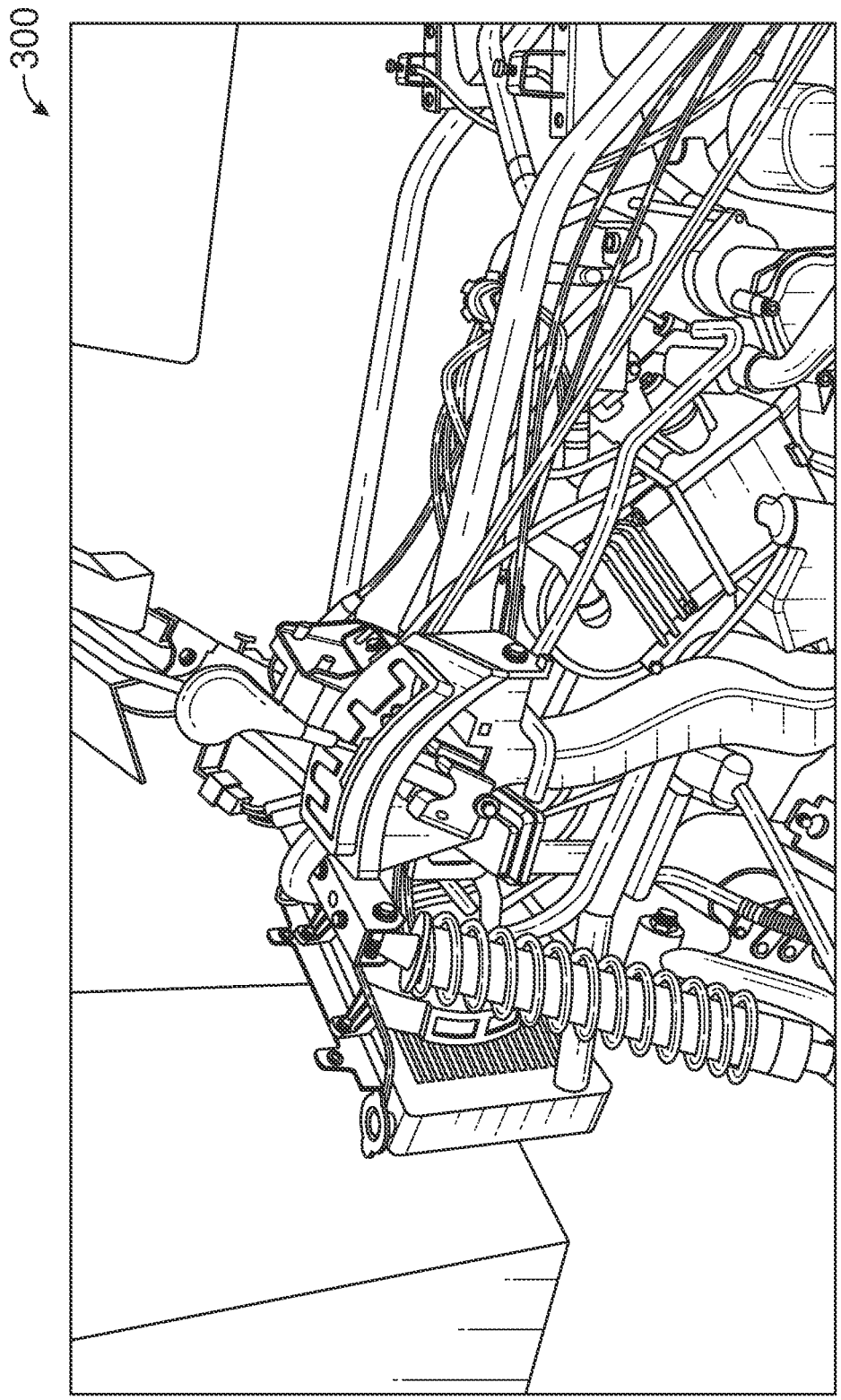
FIG. 17 illustrates how the docked arrangement of FIG. 12 remains in its fixed position within the AR environment of FIG. 3, even as the user's position and gaze change, resulting in the docked arrangement of FIG. 12 moving out of the user's view.

FIG. 15 illustrates docked arrangement 1200 in a fixed position 1500 within AR environment 300. FIG. 16 illustrates docked arrangement 1200 remaining in fixed position 1500 within AR environment 300, even as the position of user 102 has changed. FIG. 17 illustrates how docked arrangement 1200 remains in fixed position 1500 within AR environment 300, even as user 102 changes position (e.g., moves away) and eye gaze 510 and head gaze 520 change. In FIG. 17, docked arrangement 1200 is no longer within the view of user 102, although it remain within AR environment 300, so that when head gaze 520 points again toward fixed position 1500, docked arrangement 1200 will again be within view.

Figure 18:
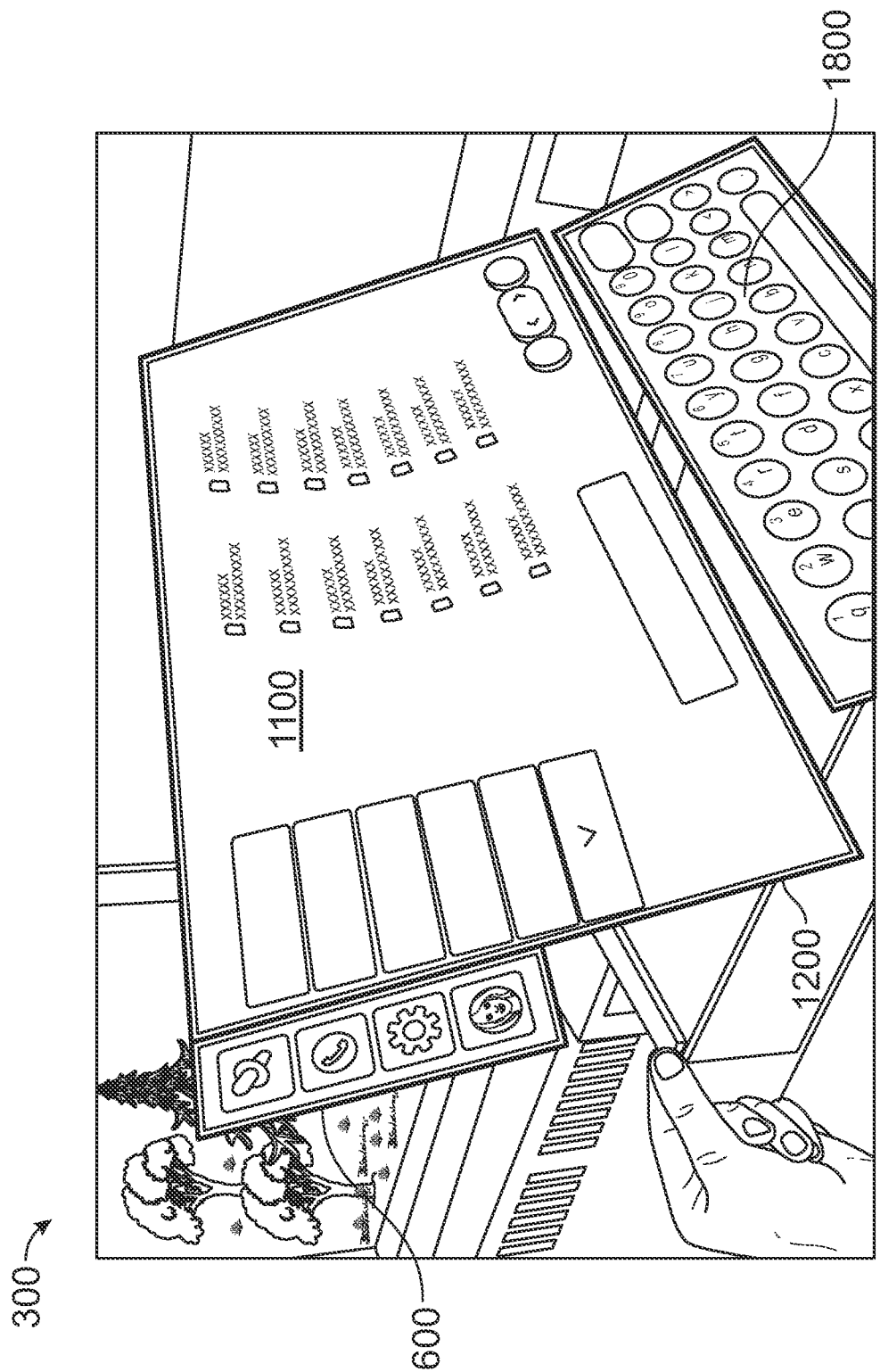
FIG. 18 illustrates a keyboard control object docked to the persistence object of FIG. 11.

FIG. 18 illustrates another control object 1800 (e.g., a keyboard) docked to persistence object 1100. In FIG. 18, the keyboard docking position is the bottom side of persistence object 1100, but some examples may use other positions (e.g., top, left side, or right side). Docked arrangement 1200 now includes (menu) control object 600, (input panel) persistence object 1100, and (keyboard) control object 1800. In some examples, a selection on control object 600 or persistence object 1100 (which, in this example, is also a control object) activates (displays) control object 1800. Other control objects (e.g., a menu, an input panel, a virtual display, and a virtual touchscreen) may also be used as control object 1800. In some scenarios, a user may wish to undock a keyboard and leave it in a fixed location. Thus, in some examples, control object 1800 may be undocked and world placed (e.g., placed in a fixed position in AR environment 300).

In some examples, when persistence object 1100 is a display screen (e.g., a virtual computer monitor), keystrokes on control object 1800 appear on persistence object 1100, similarly to typing on a computer keyboard results in keystroke characters appearing on a keyboard monitor. In some examples, control object 1800 docks instead to control object 600, for example, if persistence object 1100 is not present in AR environment 300. In some examples, activating a keyboard turns an input panel into a display screen for typing.

Figure 19:
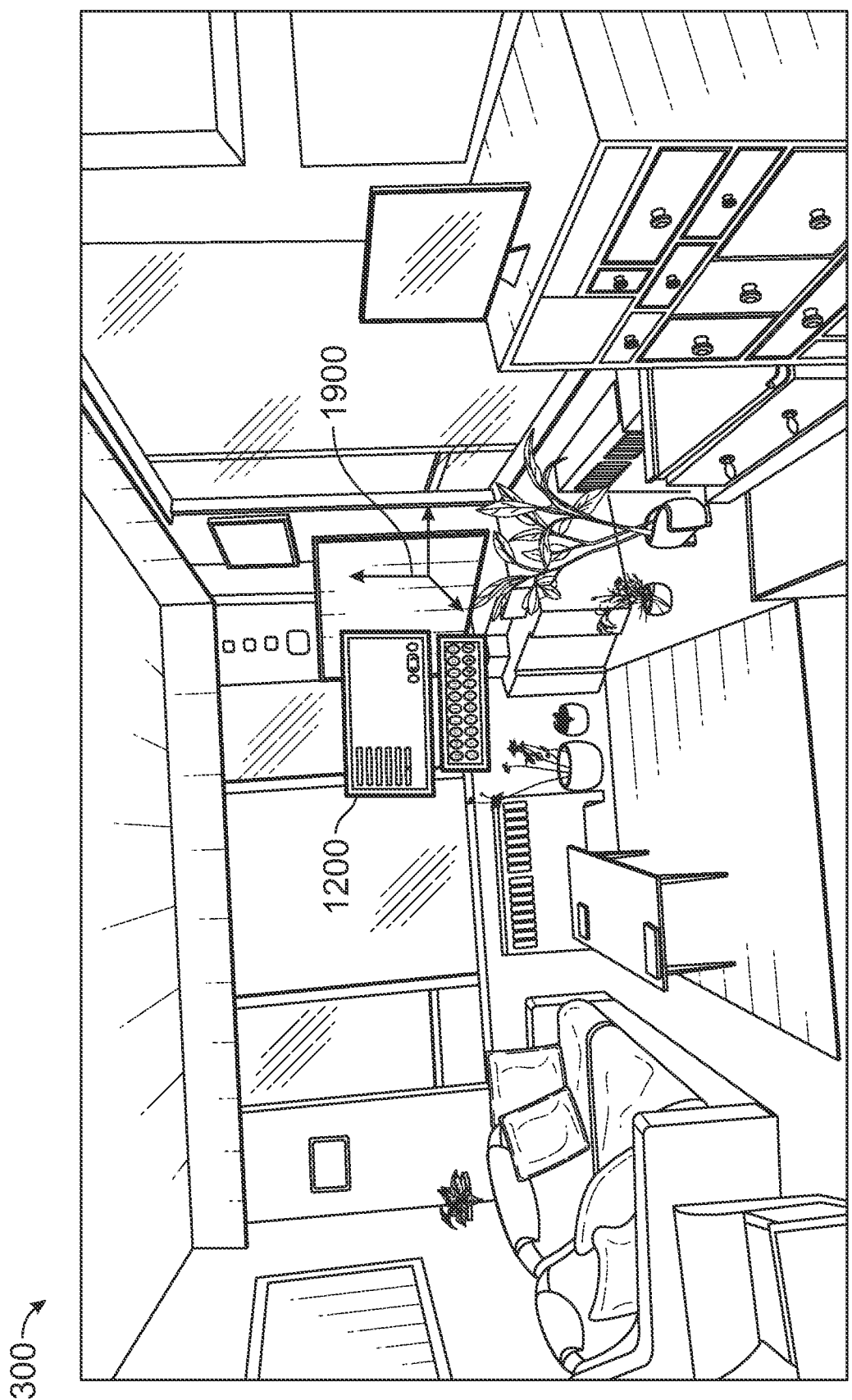
FIG. 19 illustrates the docked arrangement of FIG. 18 in a fixed position within the AR environment of FIG. 3.
Figure 20:
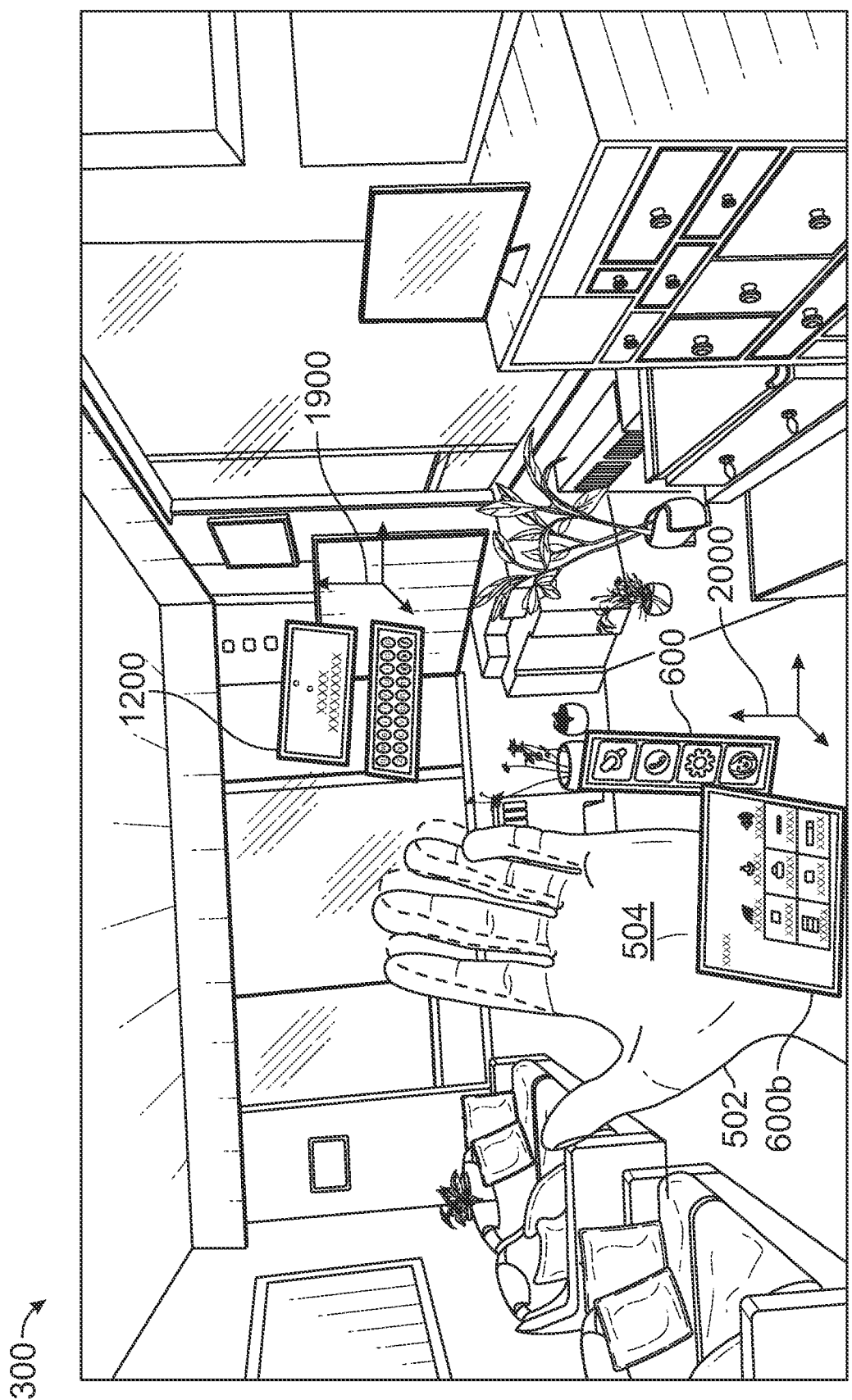
FIG. 20 illustrates summoning the menu control object of FIG. 6 to a new position proximate to the user, while the remainder of the docked arrangement of FIG. 18 remains in its fixed position.

FIG. 19 illustrates docked arrangement 1200, now with a keyboard, remaining in a fixed position 1900 within AR environment 300, even as user 102 has moved away. FIG. 20 illustrates user 102 summoning control object 600 to a new position 2000, that is proximate to user 102, while the remainder of docked arrangement 1200 (now only just persistence object 1100 and control object 1800) remains in fixed position 1900. In FIG. 20, user 102 has performed palm-facing gesture 500, with eye gaze 510 directed toward palm 504, to summon control object 600.

This summoning ability (when control object 600 is elsewhere in AR environment 300) is useful when user 102 is either far from docked arrangement 1200 or is unable to rapidly locate docked arrangement 1200. Thus, multi-factor intention determination is also used for summoning control object 600, from a docked position on persistence object 1100 within AR environment 300. The same set of indications may be used as was used to initially summon control object 600. In some examples, a different set of indications may be used to summon control object 600, when control object 600 is already docked to persistence object 1100. Some examples show an animation of display control object 600 moving from its prior position (shown in FIG. 19), from which it is summoned, to its new position (shown in FIG. 20). That is, some examples visually provide display control object 600 traversing AR environment 300 from its prior (first) position to its new (second) position.

It its new position 2000, docked to hand 502, the rules for persisting control object 600 may be the same as described above: continuing palm-facing gesture 500, maintaining eye gaze 510, or starting indication 700 or 1000 prior to the expiration of the time-out period. However, upon expiration of the time-out period, anew option is available. Whereas, in some examples, display of control object 600 may cease, in some other examples, control object 600 may return to its docked position at fixed position 1900.

Figure 21:
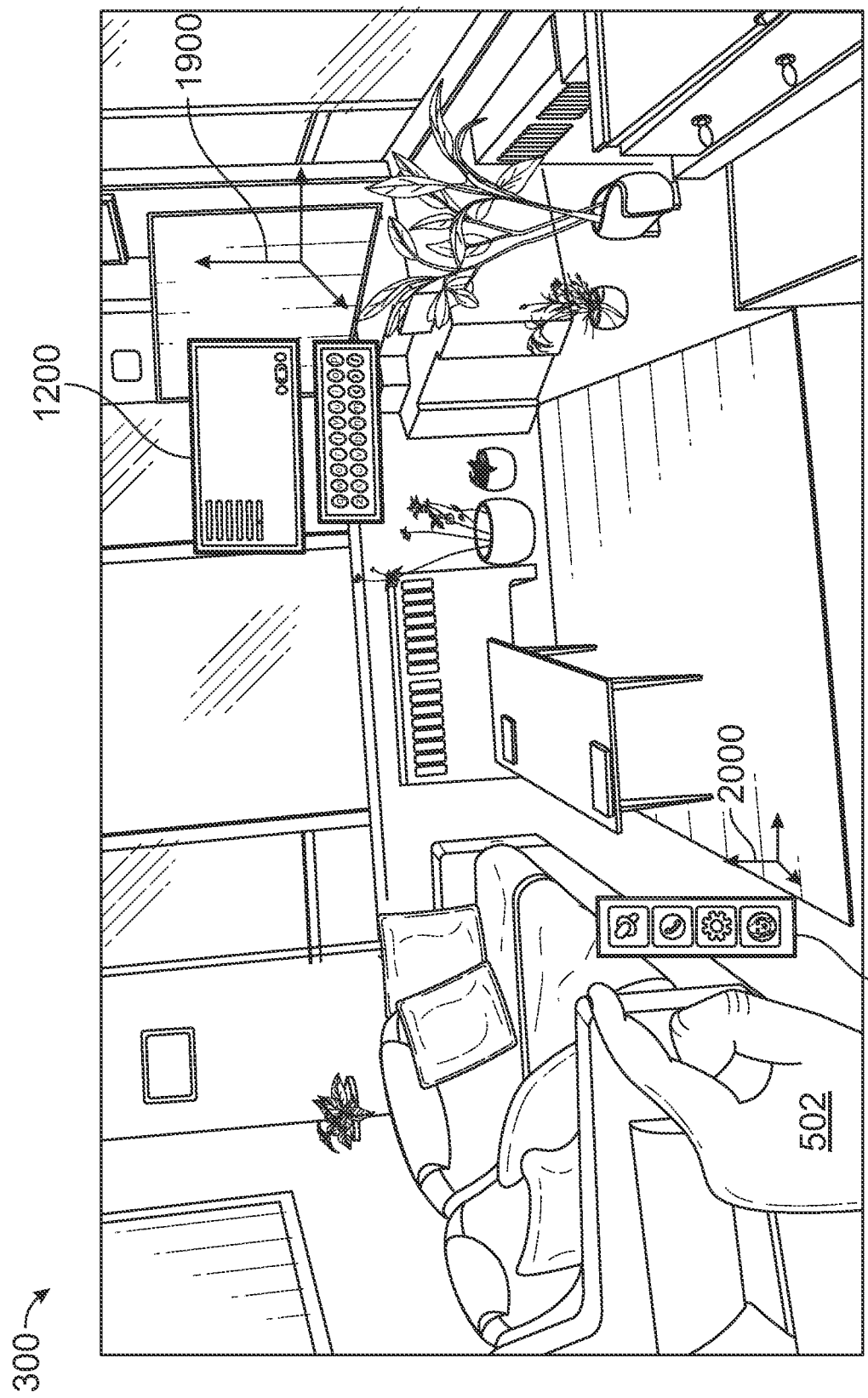
FIG. 21 illustrates using the menu control object of FIG. 6 in its new position proximate to the user, while the remainder of the docked arrangement of FIG. 18 remains in its fixed position.

Additionally, options are available for persistence object 1100 when summoning control object 600 form a docked position with persistence object 1100. Persistence object 1100 may remain in place (as shown in FIGS. 20 and 21), persistence object 1100 may redeploy to new position 2000 along with control object 600 (including bringing control object 1800) so that control object 600 remains docked to persistence object 1100, or persistence object 1100 may be dismissed (removed from AR environment 300 and no longer displayed). Also shown in FIG. 20 is an option that multiple control objects (e.g., control object and control object 600b) are displayed in response to the multi-factor intention determination that user 102 wishes to activate a control object.

FIG. 21 illustrates using control object 600 in its new position 2000 proximate to user 102, while the remainder of docked arrangement 1200 remains in its fixed position 1900.

As shown in FIG. 21, hand 502 is in near proximity of control object 600, retaining display of control object 600 at new position 2000.

Figure 22:
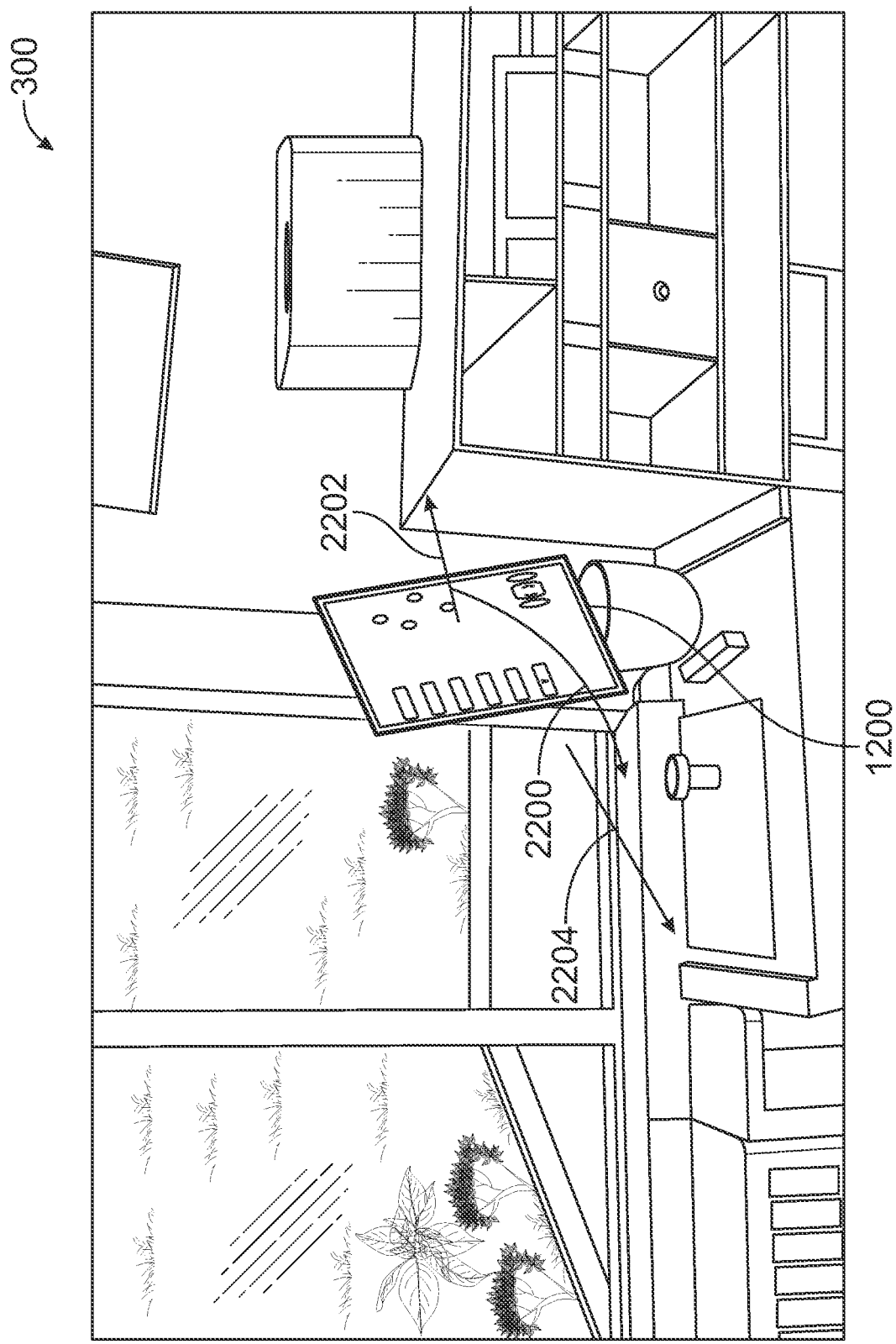
FIG. 22 illustrates the docked arrangement of FIG. 18 facing in a prior direction, as the user moves away.

FIG. 22 illustrates docked arrangement 1200 facing in a prior direction indicated by arrow 2202, as user 102 moves away. In the scenario depicted in FIG. 22, arrow 2204 points in a direction from control object 600 (which is part of docked arrangement 1200) toward user 102, forming an angle 2200 relative to the prior direction (arrow 2202). In some examples, there is a threshold angle that is permitted to develop between the facing direction of control object 600 (arrow 2202) and the direction from control object 600 to user 102 (arrow 2204). When this threshold angle is exceeded, control object 600 (and persistence object 1100, which is displayed co-planar with control object 600) re-orients to face user 102.

Figure 23:
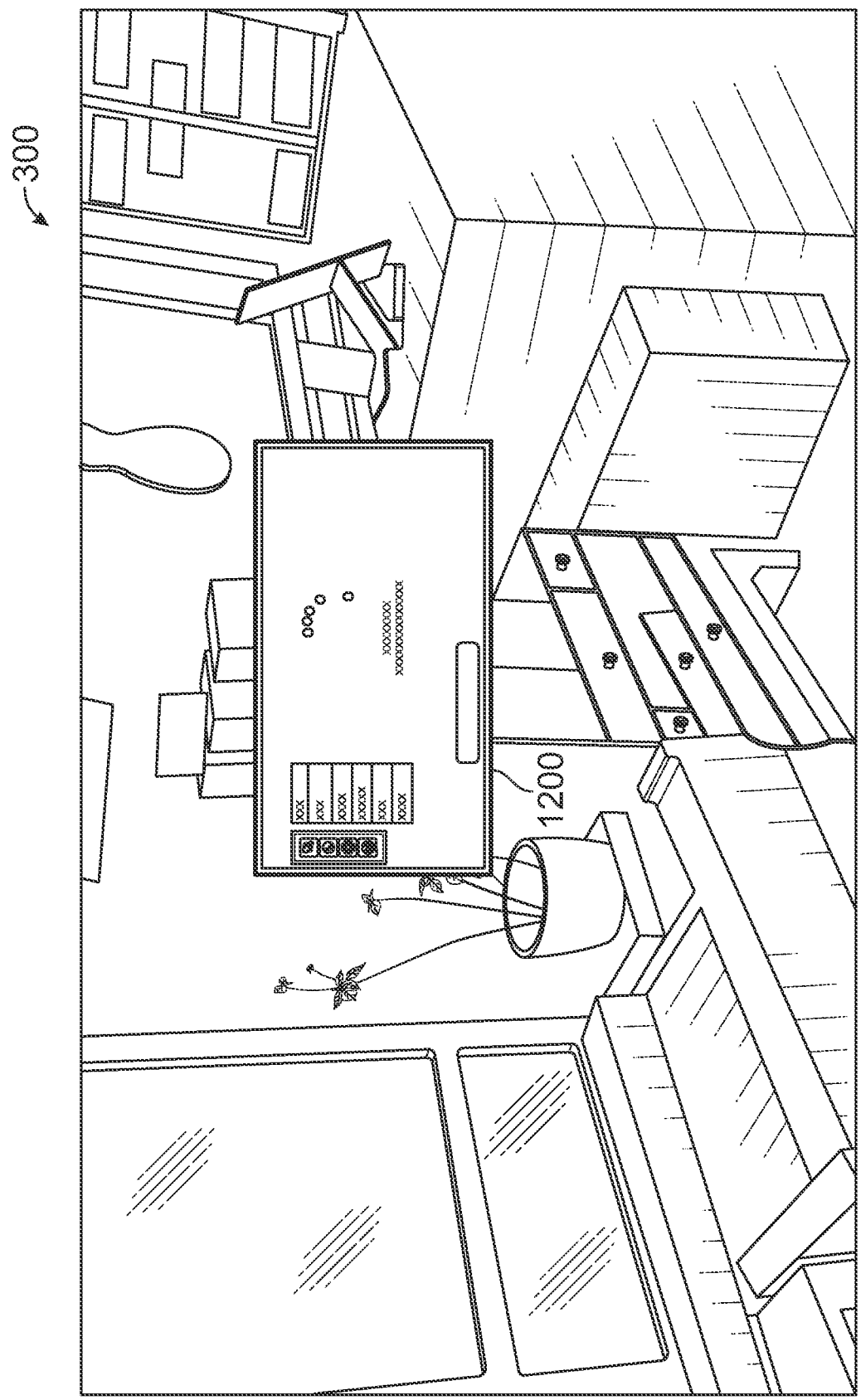
FIG. 23 illustrates the docked arrangement of FIG. 18 re-orienting to face the user.

In some examples, control object 600 continually tracks the position of user 102, remaining in place, but re-orienting to face user 102. In such examples, the threshold angle is set to practically zero. FIG. 23 illustrates docked arrangement 1200 (including control object 600) re-orienting to face user 102.

In some examples, distance between user 102 and control object 600 also affects the manner in which user 102 interacts with control object 600 persistence object, and other control objects within AR environment 300. For example, at far distances, user 102 may interact with selection buttons using a virtual laser pointer and/or head gaze 520, and at close distances, such long distance interactions are disabled so that only finger touches are used. In some examples, control objects may scale with distance (growing with increasing distance and shrinking with closing distance), so that labels remain legible and control input points remain separated. In some-examples, auto-orientation may not be used at sufficiently close ranges, because user 102 is able to reach out and grab docked arrangement 1200, as described in relation to FIGS. 13 and 14.

Figure 24:
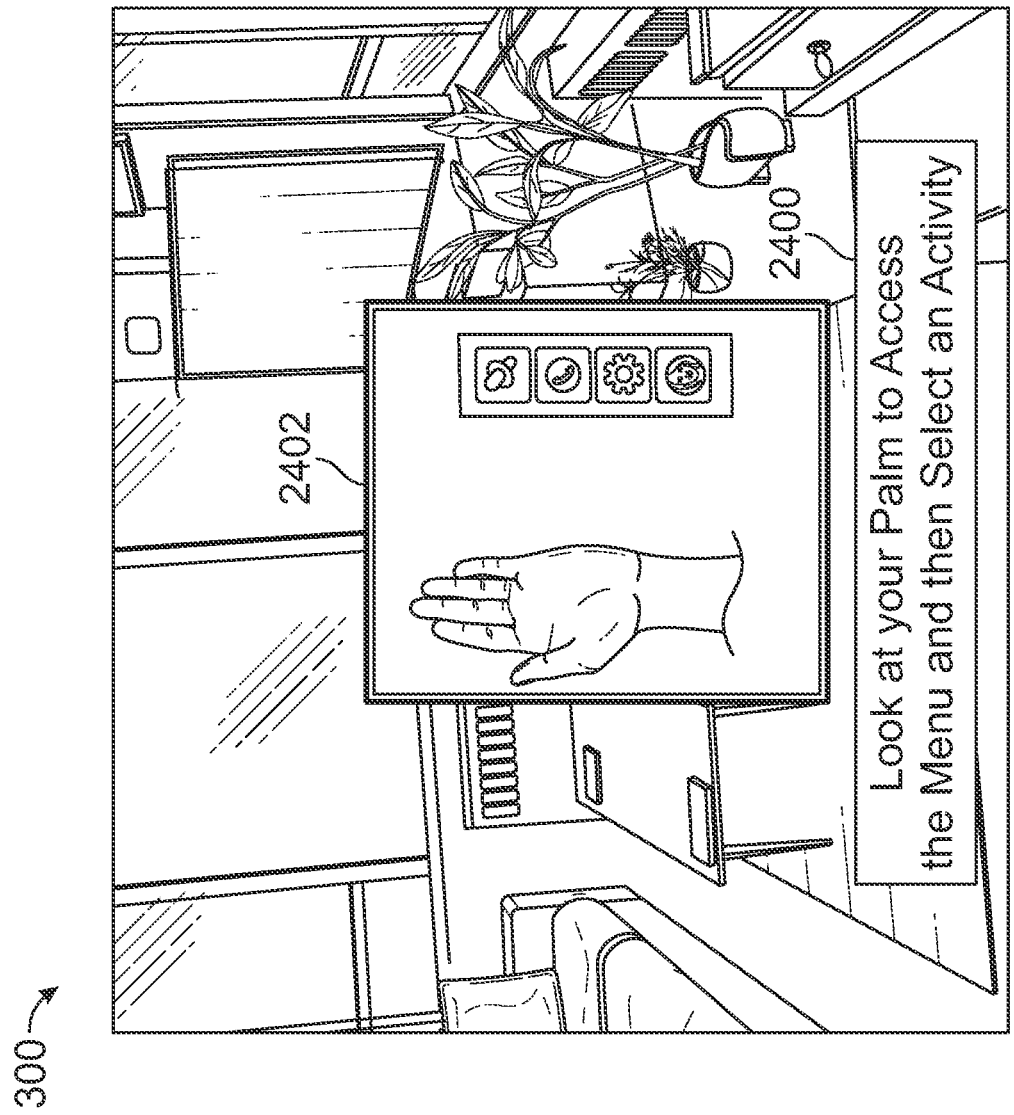
FIG. 24 illustrates a tutorial provided to the user, within the AR environment of FIG. 3, on using multi-factor intention determination to summon the control object of FIG. 6.

FIG. 24 illustrates a tutorial 2400 provided to user 102, within AR environment 300, on using multi-factor intention determination to summon control object 600. Tutorial 2400 instructs user 105 to use palm-facing gesture 500 and eye gaze 510. A demonstration model 2402 is also provided, which user 102 may readily mimic.

Figure 25A:
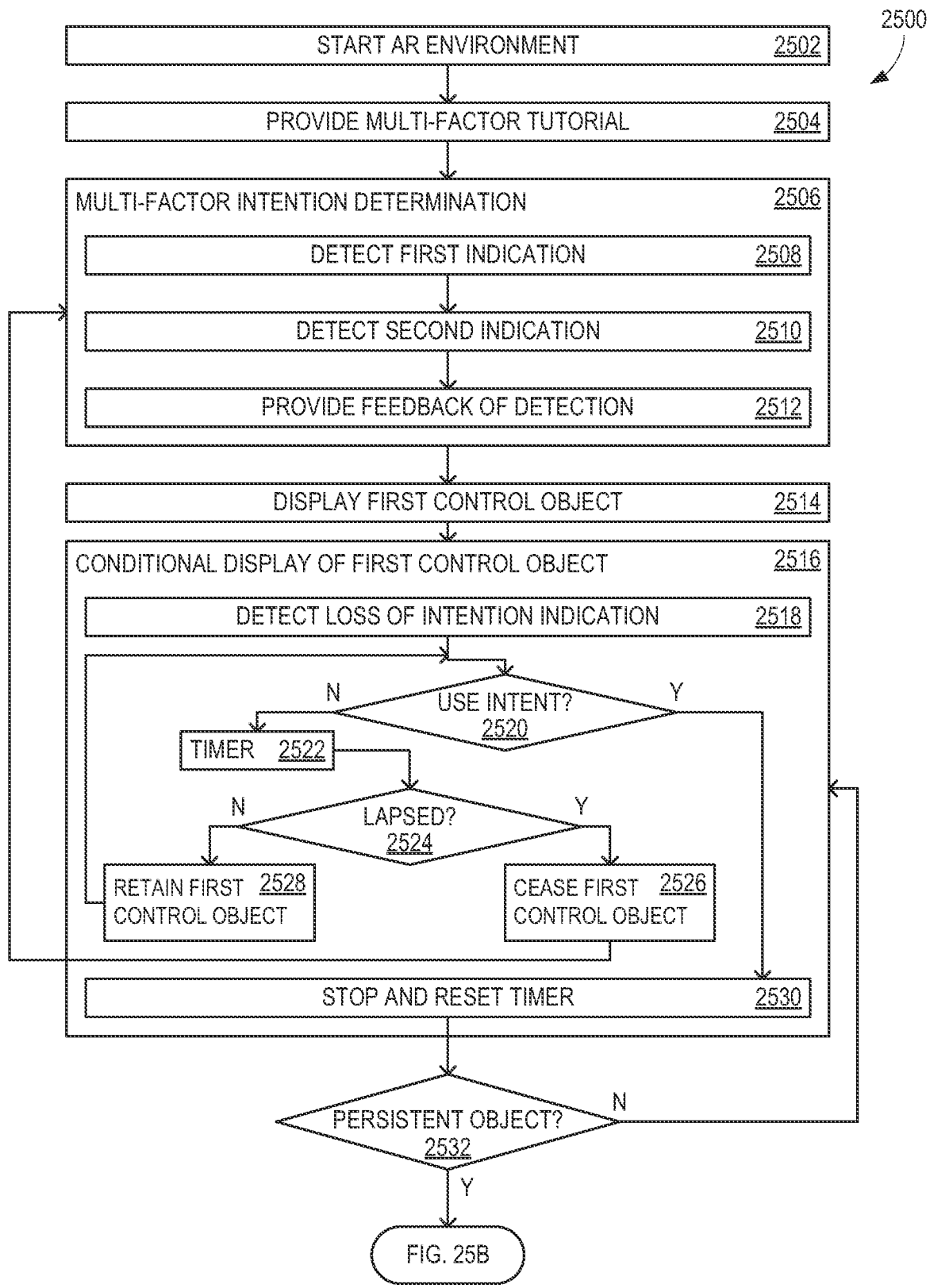

Together, FIGS. 25A and 25B show a flowchart 2500 illustrating exemplary operations associated with arrangement 100. Flowchart 2500 spans FIGS. 25A and 25B. In some examples, operations described for flowchart 2500 are performed by computing device 2700 of FIG. 27. Flowchart 2500 commences in FIG. 5A with operation 2502, which starts an AR environment. Operation 2504 provides a tutorial to the user, within the AR environment, on using multi-factor intention determination to summon the first control object.

Operation 2506, which is carried out with operations 2508-2512, performs a multi-factor intention determination for summoning a first control object using a first set of indications in the AR environment. The first set of indications comprises a plurality of indications. In some examples, the AR environment comprises an MR environment. In some examples, the multi-factor intention determination comprises a two-factor intention determination. In some examples, the first set of indications comprises at least two indications selected from the list consisting of: a palm-facing gesture, an eye gaze, a head gaze, a finger position, a hand motion, a menu selection, and a voice command. In some examples, the hand motion comprises a bloom or other finger motion. In some examples, the first position comprises a docked position that is docked to a hand of the user that is associated with an indication of the first set of indications.

Operation 2508 detecting a first indication, and operation 2510 detects a second indication. Operation 2512 provides a visual indication of detecting at least one indication of the first set of indications. In some examples, the visual indication comprises displaying a highlighting effect of a hand. Operation 2514 includes, based on at least the first set of indications indicating a summoning request by a user, displaying the first control object in a first position proximate to the user in the AR environment. In some examples, displaying a control object comprises displaying the control object on an AR viewer. In some examples, the first control object comprises at least one object selected from the list consisting of: a menu, an input panel, a keyboard, a virtual display, and a virtual touchscreen.

Operation 2516, which is implemented using operation 2518-2530, conditionally continues displaying the first control object while at least one indication of the first set of indications remains. In some examples, this is continuing to displaying the first control object in a fixed location within the AR environment while at least one indication of the first set of indications remains. Operation 2518 detects a loss of at least one indication of the first set of indications. Decision operation 2520 determines whether an intention to use the first control object has been detected.

If not, operation 2522 includes, based on at least detecting the loss of the at least one indication, start a timer—unless the timer is already running. If the timer is already running, it continues. Decision operation 2524 determines whether the timer has lapsed (e.g., reached an expiration value). If it has, then flowchart 2500 proceeds to operation 2526. Operation 2526 includes, based on at least the timer reaching the expiration value and not detecting an indication of an intention to use the first control object, ceasing display of the first control object. In some examples, the indication of an intention to use the first control object comprises at least one indication selected from the list consisting of: a finger pointing toward the first control object and a hand within a proximity threshold of the first control object. Flowchart 2500 then returns to operation 2506. If, however, in decision operation 2524, the timer had not lapsed, operation 2528 continues displaying the first control object while the timer has not yet reached the expiration value. Flowchart 2500 then returns to decision operation 2520.

If, however, in decision operation 2520, an intention to use the first control object has been detected, operation 2530 stops and resets the timer. Operation 2530 includes, based on at least detecting an indication of an intention to use the first control object prior to the timer reaching the expiration value, continue displaying the first control object. In some examples, operation 2530 includes, based on at least detecting an indication of an intention to use the first control object prior to the timer reaching the expiration value, continuing to display the first control object in a fixed location within the AR environment. In some examples, the indication of an intention to use the first control object comprises at least one indication selected from the list consisting of: a finger pointing toward the first control object and a hand within a proximity threshold of the first control object. In some examples, the indication of the intention to use the first control object uses a same hand as at least one indication of the first set of indications. In some examples, the indication of the intention to use the first control object uses a different hand as at least one indication of the first set of indications. In some examples, the indication of the intention to use the first control object occurs concurrently with at least one indication of the first set of indications.

A decision operation 2532 detects activation of a persistence object. If no persistent object has been activated, flowchart 2500 returns to operation 2516. Continuing to FIG. 5B, if a persistent object has been activated, operation 2534 includes, based on at least a selection on the first control object, displaying a persistence object. In some examples, the persistence object is displayed at a center of an eye gaze. In some examples, the persistence object is displayed at a center of a head gaze. In some examples, the persistence object comprises a second control object selected from the list consisting of: an input panel, a menu, a keyboard, a virtual display, and a virtual touchscreen. In some examples, the persistence object comprises a VR object. Operation 2536 docks the first control object to the persistence object. Operation 2538 continues displaying the first control object while the persistence object remains within the AR environment.

In some examples, operation 2540 includes, based on at least a selection on the first control object or the persistence object, displaying a third control object. In some examples, operation 2540 includes, based on at least a selection on the first control object, display a third control object. In some examples, the third control object comprises at least one object selected from the list consisting of: a keyboard, a menu, an input panel, a virtual display, and a virtual touchscreen. Operation 2542 docks the third control object to the persistence object or the first control object.

In operation 2544, the user moves away from the first control object. Operation 2546 re-orients the first control object to face the user. In some examples, operation 2546 includes, based on at least an angle between a facing direction of the first control object and a direction from the first control object to the user exceeding a threshold angle, re-orienting the first control object to face the user. In some examples, operation 2548 includes, based on at least a distance between the first control object and the user, scaling the first control object. In some examples, operation 2548 includes, based on at least a distance between a fourth control object and the user, scaling the fourth control object.

Operation 2550 performs the multi-factor intention determination for summoning the first control object, from a docked position on a persistence object within the AR environment, using a second set of indications in the AR environment, the second set of indications comprising a plurality of indications. Operation 2550 may be similar to operation 2508. Operation 2552 includes, based on at least the second set of indications indicating a summoning request by the user, displaying the first control object in a second position proximate to the user in the AR environment. In some examples, the second set of indications comprises at least two indications selected from the list consisting of: a palm-facing gesture, an eye gaze, a head gaze, a finger position, a hand motion, a menu selection, and a voice command. In some examples, the hand motion comprises a bloom or other finger motion. In some examples, the second position comprises a docked position that is docked to a hand of the user that is associated with an indication of the first set of indications.

Based on optional implementation choices, one of operation 2554-2558 is then performed. Operation 2554 includes, based on at least displaying the first control object in the second position, retain the persistence object in its current position within the AR environment. Operation 2556 includes, based on at least displaying the first control object in the second position, remove the persistence object from the AR environment. Operation 2558 includes, based on at least displaying the first control object in the second position, moving the persistence object within the AR environment such that the first control object remains docked to the persistence object.

Figure 26A:
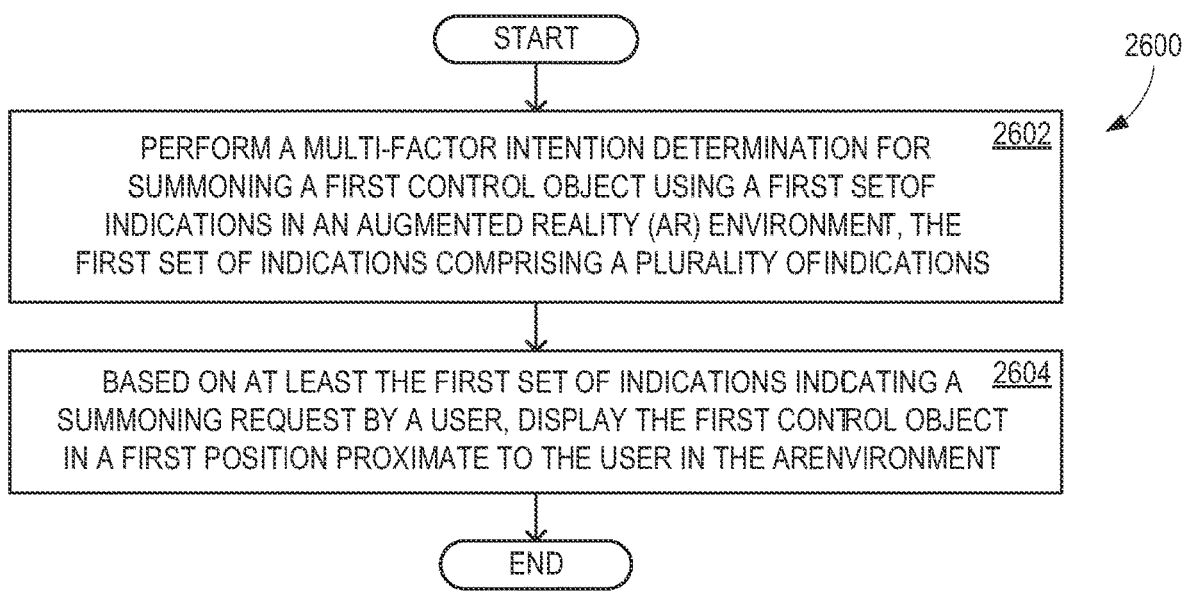
FIG. 26A shows another flowchart illustrating exemplary operations associated with the arrangement of FIG. 1.

FIG. 26A is a flowchart 2600 illustrating exemplary operations associated with arrangement 100. In some examples, operations described for flowchart 2600 are performed by computing device 2700 of FIG. 27. Flowchart 2600 commences with operation 2602, which includes performing a multi-factor intention determination for summoning a first control object using a first set of indications in an augmented reality (AR) environment, the first set of indications comprising a plurality of indications. Operation 2604 includes, based on at least the first set of indications indicating a summoning request by a user, displaying the first control object in a first position proximate to the user in the AR environment.

Figure 26B:
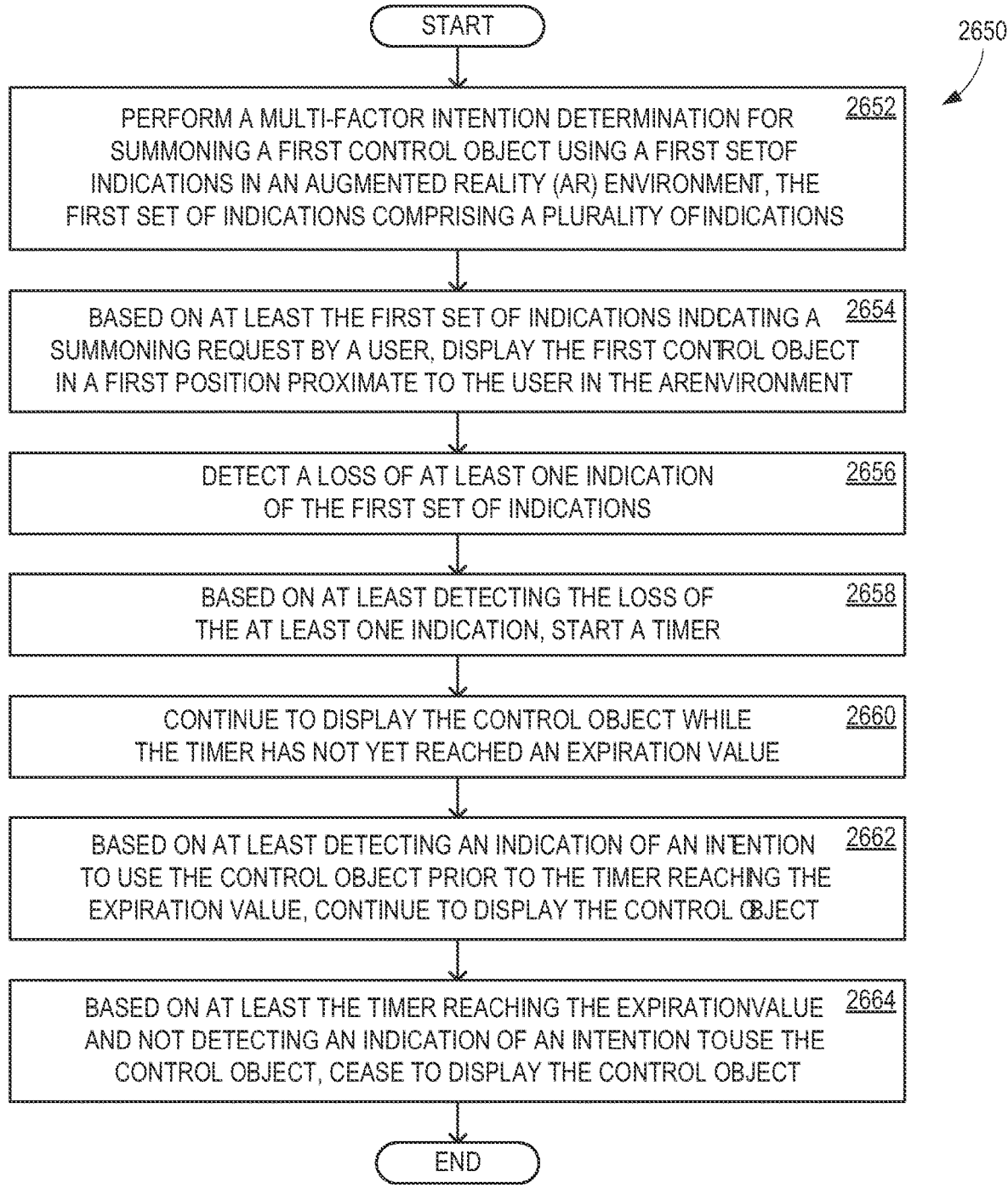
FIG. 26B shows another flowchart illustrating exemplary operations associated with the arrangement of FIG. 1.

FIG. 26B is a flowchart 2650 illustrating exemplary operations associated with arrangement 100. In some examples, operations described for flowchart 2650 are performed by computing device 2700 of FIG. 27. Some examples of flowchart 2650 commence with operation 2652, which includes performing a multi-factor intention determination for summoning a first control object using a first set of indications in an AR environment, the first set of indications comprising a plurality of indications. Operation 2654 includes, based on at least the first set of indications indicating a summoning request by a user, displaying the first control object in a first position proximate to the user in the AR environment.

Operation 2656 includes detecting a loss of at least one indication of the first set of indications. Operation 2658 includes, based on at least detecting the loss of the at least one indication, starting a timer. Operation 2660 includes continue displaying the control object while the timer has not yet reached an expiration value. Operation 2662 includes, based on at least detecting an indication of an intention to use the control object prior to the timer reaching the expiration value, continue displaying the control object. Operation 2664 includes, based on at least the timer reaching the expiration value and not detecting an indication of an intention to use the control object, cease displaying the control object.

Additional Examples

An example computerized method comprises: performing a multi-factor intention determination for summoning a first control object using a first set of indications in an AR environment, the first set of indications comprising a plurality of indications; and based on at least the first set of indications indicating a summoning request by a user, displaying the first control object in a first position proximate to the user in the AR environment.

Another example method comprises: performing a multi-factor intention determination for summoning a control object using a first set of indications in an AR environment, the first set of indications comprising a plurality of indications; based on at least the first set of indications indicating a summoning request by a user, displaying the control object in a first position proximate to the user in the AR environment; detecting a loss of at least one indication of the first set of indications; based on at least detecting the loss of the at least one indication, starting a timer; and continue displaying the control object while the timer has not yet reached an expiration value.

An example system comprises: a processor; and a computer-readable medium storing instructions that are operative upon execution by the processor to: perform a multi-factor intention determination for summoning a control object using a first set of indications in an augmented reality (AR) environment, the first set of indications comprising a plurality of indications; and based on at least the first set of indications indicating a summoning request by a user, display the control object in a first position proximate to the user in the AR environment; detect a loss of at least one indication of the first set of indications; based on at least detecting the loss of the at least one indication, start a timer; continue to display the control object while the timer has not yet reached an expiration value; based on at least detecting an indication of an intention to use the control object prior to the timer reaching the expiration value, continue to display the control object; and based on at least the timer reaching the expiration value and not detecting an indication of an intention to use the control object, cease to display the control object.

One or more example computer storage devices has computer-executable instructions stored thereon, which, on execution by a computer, cause the computer to perform operations comprising: performing a multi-factor intention determination for summoning a control object using a first set of indications in an A) environment, the first set of indications comprising a plurality of indications; based on at least the first set of indications indicating a summoning request by a user, displaying the control object in a first position proximate to the user in the AR environment; detecting a loss of at least one indication of the first set of indications; based on at least detecting the loss of the at least one indication, starting a timer; continue displaying the control object while the timer has not yet reached an expiration value; based on at least detecting an indication of an intention to use the control object prior to the timer reaching the expiration value, continue displaying the control object; and based on at least the timer reaching the expiration value and not detecting an indication of an intention to use the control object, cease displaying the control object.

Alternatively, or in addition to the other examples described herein, examples include any combination of the following:

- the multi-factor intention determination comprises a two-factor intention determination;
- the first control object comprises at least one object selected from the list consisting of: a menu, a keyboard, an input panel, a virtual display, and a virtual touchscreen;
- the first set of indications comprises at least two indications selected from the list consisting of: a palm-facing gesture, an eye gaze, a head gaze, a finger position, a hand motion, a menu selection, and a voice command;
- the hand motion comprises a bloom or other finger motion;
- the AR environment comprises an MR environment;
- the first position comprises a docked position that is docked to a hand of the user that is associated with an indication of the first set of indications.
- continue displaying the first control object while at least one indication of the first set of indications remains;
- continue displaying the first control object in a fixed location within the AR environment while at least one indication of the first set of indications remains;
- detect a loss of at least one indication of the first set of indications;
- based on at least detecting the loss of the at least one indication, start a timer;
- continue displaying the first control object while the timer has not yet reached an expiration value;
- based on at least the timer reaching the expiration value and not detecting an indication of an intention to use the first control object, cease displaying the first control object;
- based on at least detecting an indication of an intention to use the first control object prior to the timer reaching the expiration value, continue displaying the first control object;
- based on at least detecting an indication of an intention to use the first control object prior to the timer reaching the expiration value, continue displaying the first control object in a fixed location within the AR environment;
- the indication of an intention to use the first control object comprises at least one indication selected from the list consisting of: a finger pointing toward the first control object and a hand within a proximity threshold of the first control object;
- the indication of the intention to use the first control object uses a same hand as at least one indication of the first set of indications;
- the indication of the intention to use the first control object uses a different hand as at least one indication of the first set of indications;
- the indication of the intention to use the first control object occurs concurrently with at least one indication of the first set of indications;
- dock the first control object to a persistence object;
- continue displaying the first control object while the persistence object remains within the AR environment;
- the persistence object comprises a second control object selected from the list consisting of: an input panel, a menu, a keyboard, a virtual display, and a virtual touchscreen;
- the persistence object comprises a VR object;
- based on at least a selection on the first control object, display the persistence object;
- based on at least a selection on the first control object, display the persistence object at a center of an eye gaze;
- based on at least a selection on the first control object, display the persistence object at a center of a head gaze;
- based on at least a selection on the first control object or the persistence object, display a third control object;
- dock the third control object to the persistence object or the first control object;
- based on at least a selection on the first control object, display a third control object;
- dock the third control object to the first control object;
- the third control object comprises at least one object selected from the list consisting of: a keyboard, a menu, an input panel, a virtual display, and a virtual touchscreen;
- perform the multi-factor intention determination for summoning the first control object, from a docked position on a persistence object within the AR environment, using a second set of indications in the AR environment, the second set of indications comprising a plurality of indications;
- based on at least the second set of indications indicating a summoning request by the user, displaying the first control object in a second position proximate to the user in the AR environment;

the second set of indications comprises at least two indications selected from the list consisting of: a palm-facing gesture, an eye gaze, a head gaze, a finger position, a hand motion, a menu selection, and a voice command;

the hand motion comprises a bloom or other finger motion;

the second position comprises a docked position that is docked to a hand of the user that is associated with an indication of the second set of indications;

display the first control object traversing the AR environment from the first position to the second position;

based on at least displaying the first control object in the second position, retain the persistence object in its current position within the AR environment;

based on at least displaying the first control object in the second position, remove the persistence object from the AR environment;

based on at least displaying the first control object in the second position, moving the persistence object within the AR environment such that the first control object remains docked to the persistence object;

provide a visual indication of detecting at least one indication of the first set of indications;

the visual indication comprises displaying a highlighting effect of a hand;

re-orient the first control object to face the user;

based on at least an angle between a facing direction of the first control object and a direction from the first control object to the user exceeding a threshold angle, re-orient the first control object to face the user;

based on at least a distance between the first control object and the user, scale the first control object;

based on at least a distance between a fourth control object and the user, scale the fourth control object;

provide a tutorial to the user, within the AR environment, on using multi-factor intention determination to summon the first control object;

displaying a control object comprises displaying the control object on an AR viewer; and an AR viewer.

While the aspects of the disclosure have been described in terms of various examples with their associated operations, a person skilled in the art would appreciate that a combination of operations from any number of different examples is also within scope of the aspects of the disclosure.

Example Operating Environment

Figure 27:
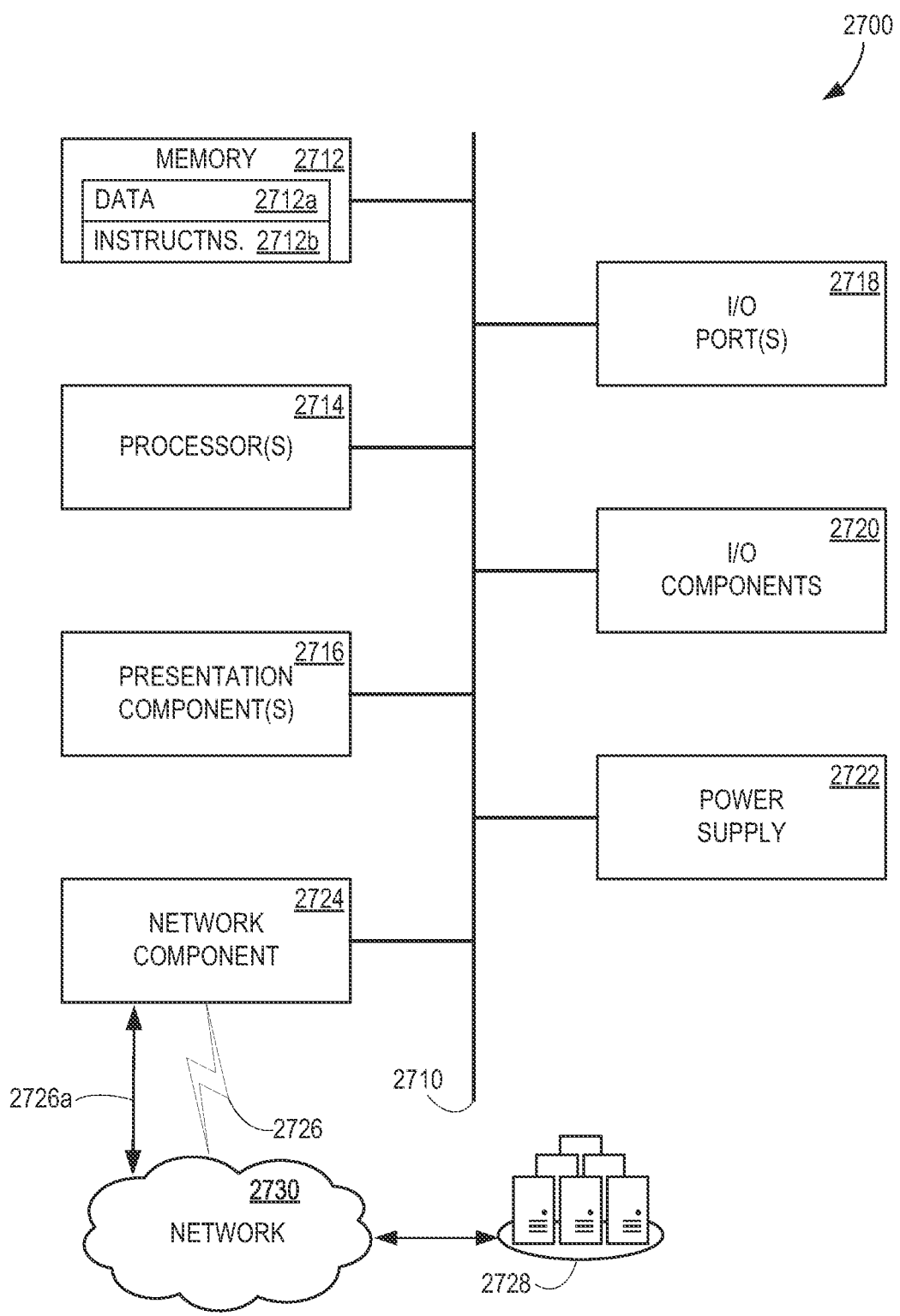
FIG. 27 is a block diagram of an example computing environment suitable for implementing some of the various examples disclosed herein; and Corresponding reference characters indicate corresponding parts throughout the drawings.

FIG. 27 is a block diagram of an example computing device 2700 for implementing aspects disclosed herein, and is designated generally as computing device 2700. In some examples, one or more computing devices 2700 are provided for an on-premises computing solution. In some examples, one or more computing devices 2700 are provided as a cloud computing solution. In some examples, a combination of on-premises and cloud computing solutions are used. Computing device 2700 is but one example of a suitable computing environment and is not intended to suggest any limitation as to the scope of use or functionality of the examples disclosed herein, whether used singly or as part of a larger set.

Neither should computing device 2700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 2700 includes a bus 2710 that directly or indirectly couples the following devices: computer storage memory 2712, one or more processors 2714, one or more presentation components 2716, input/output (I/O) ports 2718, I/O components 2720, a power supply 2722, and a network component 2724. While computing device 2700 is depicted as a seemingly single device, multiple computing devices 2700 may work together and share the depicted device resources. For example, memory 2712 may be distributed across multiple devices, and processor(s) 2714 may be housed with different devices.

Bus 2710 represents what may be one or more busses (such as an address bus, data bus, or a combination thereof). Although the various blocks of FIG. 27 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 27 and the references herein to a "computing device." Memory 2712 may take the form of the computer storage media referenced below and operatively provide storage of computer-readable instructions, data structures, program modules and other data for the computing device 2700. In some examples, memory 2712 stores one or more of an operating system, a universal application platform, or other program modules and program data. Memory 2712 is thus able to store and access data 2712a and instructions 2712b that are executable by processor 2714 and configured to carry out the various operations disclosed herein.

In some examples, memory 2712 includes computer storage media. Memory 2712 may include any quantity of memory associated with or accessible by the computing device 2700. Memory 2712 may be internal to the computing device 2700 (as shown in FIG. 27), external to the computing device 2700 (not shown), or both (not shown). Additionally, or alternatively, the memory 2712 may be distributed across multiple computing devices 2700, for example, in a virtualized environment in which instruction processing is carried out on multiple computing devices 2700. For the purposes of this disclosure, "computer storage media," "computer-storage memory," "memory," and "memory devices" are synonymous terms for the computer-storage memory 2712, and none of these terms include carrier waves or propagating signaling.

Processor(s) 2714 may include any quantity of processing units that read data from various entities, such as memory 2712 or I/O components 2720. Specifically, processor(s) 2714 are programmed to execute computer-executable instructions for implementing aspects of the disclosure. The instructions may be performed by the processor, by multiple processors within the computing device 2700, or by a processor external to the client computing device 2700. In some examples, the processor(s) 2714 are programmed to execute instructions such as those illustrated in the flow charts discussed below and depicted in the accompanying drawings. Moreover, in some examples, the processor(s) 2714 represent an implementation of analog techniques to perform the operations described herein. For example, the operations may be performed by an analog client computing device 2700 and/or a digital client computing device 2700. Presentation component(s) 2716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 2700, across a wired connection, or in other ways. I/O ports 2718 allow computing device 2700 to be logically coupled to other devices including I/O components 2720, some of which may be built in. Example I/O components 2720 include, for example but without limitation, a microphone, joystick, game pad, satellite dish, scanner, printer, wireless device, etc.

The computing device 2700 may operate in a networked environment via the network component 2724 using logical connections to one or more remote computers. In some examples, the network component 2724 includes a network interface card and/or computer-executable instructions (e.g., a driver) for operating the network interface card. Communication between the computing device 2700 and other devices may occur using any protocol or mechanism over any wired or wireless connection. In some examples, network component 2724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 2724 communicates over wireless communication link 2726 and/or a wired communication link 2726a to a remote resource 2728 (e.g., a cloud resource) across network 2730. Various different examples of communication links 2726 and 2726a include a wireless connection, a wired connection, and/or a dedicated link, and in some examples, at least a portion is routed through the internet.

Although described in connection with an example computing device 2700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
perform a multi-factor intention determination for summoning a control object by detecting at least a first indication of a user and a second indication of the user in an augmented reality (AR) environment, the first indication and the second indication belonging to a set of indications that are configured to summon the control object upon detection;
based on detection of at least the first indication and the second indication, display the control object in a first position proximate to the user in the AR environment;
detect a loss of at least the first indication;
based on detecting the loss of the first indication, start a timer;
continue to display the control object at least until the timer has not yet reached an expiration value;
detect a gesture from the user;
determine that the gesture indicates an intention by the user to use the control object prior to the timer reaching the expiration value; and based on determining that the gesture indicates the intention by the user to use the control object continue to display the control object.

2. The system of claim 1, wherein the instructions are further operative to:
dock the control object to a persistence object within the AR environment;
perform the multi-factor intention determination for summoning the control object, from a docked position on the persistence object, using a third indication in the AR environment; and
based on at least the third indication indicating a summoning request by the user, display the control object in a second position proximate to the user in the AR environment.

3. The system of claim 2,
wherein the control object comprises at least one object selected from a list consisting of: a menu, a keyboard, an input panel, a virtual display, and a virtual touchscreen;
wherein at least one of the first indication or the second indication comprises at least two indications selected from the list consisting of: a palm-facing gesture, an eye gaze, a head gaze, a finger position, a hand motion, a menu selection, and a voice command;
wherein the hand motion comprises a bloom or other finger motion; and
wherein the first position and the second position each comprises a docked position that is docked to a hand of the user that is associated with the first indication.

4. The system of claim 1, wherein the gesture indicating the intention by the user to use the control object uses a same hand as the first indication.

5. The system of claim 1, wherein the gesture indicating the intention by the user to use the control object uses a different hand as the first indication.

6. The system of claim 1, wherein the gesture indicating the intention by the user to use the control object is detected concurrently with the second indication.

7. The system of claim 1, further comprising:
an AR viewer.

8. A computerized method comprising:
performing a multi-factor intention determination for summoning a control object by detecting at least a first indication of a user and a second indication of the user in an augmented reality (AR) environment, the first indication and the second indication belonging to a set of indications that are configured to summon the control object upon detection;
based on detection of at least the first indication and the second indication, displaying the control object in a first position proximate to the user in the AR environment;
detecting a loss of at least the first indication;
based on detecting the loss of the first indication, starting a timer;
continuing to display the control object at least until the timer has reached an expiration value;
detecting a gesture from the user;
determining that the gesture indicates an intention by the user to use the control object prior to the timer reaching the expiration value; and
based on determining that the gesture indicates the intention by the user to use the control object continue to display the control object.

9. The method of claim 8, further comprising:
docking the control object to a persistence object within the AR environment;
performing the multi-factor intention determination for summoning the control object, from a docked position on the persistence object, using a third indication in the AR environment; and
based on at least the third indication indicating a summoning request by the user, display the control object in a second position proximate to the user in the AR environment.

10. The method of claim 9,
wherein the control object comprises at least one object selected from a list consisting of:
a menu, a keyboard, an input panel, a virtual display, and a virtual touchscreen;
wherein at least one of the first indication or the second indication comprises at least two indications selected from a list consisting of:
a palm-facing gesture, an eye gaze, a head gaze, a finger position, a hand motion, a menu selection, and a voice command;
wherein the hand motion comprises a bloom or other finger motion; and
wherein the first position and the second position each comprises a docked position that is docked to a hand of the user that is associated with the first indication.

11. The method of claim 8, wherein the gesture indicating the intention by the user to use the control object uses a same hand as the first indication.

12. The method of claim 8, wherein the gesture indicating the intention by the user to use the control object uses a different hand as the first indication.

13. The method of claim 8, wherein the gesture indicating the intention by the user to use the control object is detected concurrently with the second indication.

14. The method of claim 8, further comprising:
based on at least an angle between a facing direction of the control object and a direction from the control object to the user exceeding a threshold angle, re-orient the control object to face the user.

15. One or more computer storage devices having computer-executable instructions stored thereon, which, upon execution by a computer, cause the computer to perform operations comprising:
performing a multi-factor intention determination for summoning a control object by detecting at least a first indication of a user and a second indication of the user in an augmented reality (AR) environment, the first indication and the second indication belonging to a set of indications that are configured to summon the control object upon detection;
based on detection of at least the first indication and the second indication, displaying the control object in a first position proximate to the user in the AR environment;
detecting a loss of at least the first indication;
based on detecting the loss of the first indication, starting a timer;
continuing to display the control object at least until the timer has reached an expiration value;
detecting a gesture from the user;
determining that the gesture indicates an intention by the user to use the control object prior to the timer reaching the expiration value; and
based on determining that the gesture indicates the intention by the user to use the control object continue to display the control object.

16. The one or more computer storage devices of claim 15, wherein the operations further comprise:
based on at least a distance between the control object and the user, scaling the control object.

17. The one or more computer storage devices of claim 15, wherein the operations further comprise:
providing a tutorial to the user, within the AR environment, on using multi-factor intention determination to summon the control object.

18. The one or more computer storage devices of claim 15, wherein the second indication continues to be detected after detecting the loss of the first indication.

19. The system of claim 1, wherein the second indication continues to be detected after detecting the loss of the first indication.

20. The method of claim 8, wherein the second indication continues to be detected after detecting the loss of the first indication.

* * * * *